(12) United States Patent
Ford et al.

(10) Patent No.: US 6,891,676 B2
(45) Date of Patent: May 10, 2005

(54) TUNABLE SPECTRAL FILTER

(75) Inventors: Joseph Earl Ford, Del Mar, CA (US); Gordon Wilson, San Francisco, CA (US)

(73) Assignee: Bookham Technology PLC, Northamptonshire (GB)

(*) Notice: Subject to any disclaimer, the term of this patent is extended or adjusted under 35 U.S.C. 154(b) by 2 days.

(21) Appl. No.: 10/340,219

(22) Filed: Jan. 10, 2003

(65) Prior Publication Data

US 2004/0136074 A1 Jul. 15, 2004

(51) Int. Cl.[7] .................................................. G02B 26/02
(52) U.S. Cl. ...................... 359/572; 359/569; 385/16; 385/37; 385/24; 356/328
(58) Field of Search ............................... 359/572, 569; 385/16, 37, 24; 356/326, 328, 334; 250/339.07

(56) References Cited

U.S. PATENT DOCUMENTS

2003/0007148 A1 * 1/2003 Moon et al. ................ 356/328

OTHER PUBLICATIONS

Marom, et al., "Wavelength–selective 1×4 switch for 128 WDM channels at 50 GHz spacing"; OFC 2002 Postdeadline Papers; FB7–1–FB7–3; Mar. 2002.

Berger, et al., "Widely tunable external cavity diode laser based on a MEMS electrostatic rotary actuator"; 27th ECOC; pp198–199, 2001.

Tayebati, et al., "Widely tunable fabry–perot filter using Ga(Al)As–Al0x Deformable Mirrors"; IEEE Photonics Technology Let, pp394–396; Mar.1998.

Kiang, et al., "Surface Micromachined Diffraction Gratings for Scanning Spectroscopic Applications"; Proc.Int.Cof. Sol–State Sensor; Jun. 1997.

* cited by examiner

*Primary Examiner*—Fayez G. Assaf
(74) *Attorney, Agent, or Firm*—Jeffery J. Brosemer

(57) ABSTRACT

An optical spectral filtering device and associated method for selectively directing a portion of a wavelength multiplexed input signal, entering through an optical fiber, into one or more output signals provided to one or more optical fibers and/or electronic outputs. The optical filtering is accomplished using free-space diffractive wavelength demultiplexing optics combined with a fixed (permanent) patterned structure located in the spectrally dispersed image plane. The structure can block or direct a selected spectral portion of the optical signal to one or more separate outputs, such as an optical fiber or power detector. A single active element in the optical path is used to spatially shift, or steer, the entire input spectrum at the dispersed spectral image plane, to control the portion of the input spectrum illuminating specific features on the permanent patterned structure.

23 Claims, 22 Drawing Sheets

TUNABLE SPECTRAL FILTER

BACKGROUND OF THE INVENTION

1. Field of the Invention

This invention relates generally to the field of optical communications and in particular to a tunable spectral filter for selectively attenuating and/or switching—as a function of wavelength—the optical power of an optical communications signal.

2. Description of the Prior Art

Fourier-plane (FP) filters are one class of prior-art optical filter components. In FIG. 1, there is shown such a prior art filter 100. In such FP filters, light from an input fiber 101 is collimated by a lens 102, and aligned so that a collimated beam illuminates a permanent optical spectral filter 103 located in the collimated, or Fourier-transformed, plane. Light that is reflected by the permanent optical spectral filter 103 is focused by a second, reverse pass through collimator lens 102 into an output fiber 104 thereby forming a two-port optical filter. Similarly, a three-port filter may be constructed by aligning a second collimator lens 105, such that light which is transmitted by the filter 103 is directed into a second output fiber 106.

As can be readily appreciated, the optical spectral filter 103 might be a fixed dielectric stack, transmitting a predetermined optical wavelength band or spectral profile. A dynamic two-port spectral filter replaces the fixed filter 103 with an electrically-controlled element to modify the spectral reflection and transmission profile, as for example the micromechanical etalon filter described in the article entitled, "Widely tunable Fabry-Perot filter using Ga(Al)As—AlOx deformable mirrors" authored by P. Tayebati et al, and which appeared in IEEE Photonics Technology Letters, pages 394–396, in March 1998. In this device described therein, a voltage adjusts an air space between two reflective layers to control the center wavelength of a narrow transmission band. A tunable spectral filter based on such a device is currently manufactured by Nortel Networks®. In one version of this commercially available component, model number MT-15-300, a voltage from 0 to 50 V controls the center wavelength of a 0.35 nm wide transmission notch within a 100 nm tuning range. Such a filter is used, for example, to select a single wavelength data transmission signal. Other versions of this component have narrower 0.06 nm and 0.02 nm transmission bandwidths (model numbers MT-15-100 and MT-15-25, respectively). Such filters are typically used in optical spectrum analyzers, which measure the average power as a function of wavelength in a WDM transmission system.

Tunable, Fourier-plane (TFP) filter devices are simple, compact and relatively inexpensive. However, the only degree of control afforded by TFP filter devices is in the center wavelength. The different tunable filter models described above are necessary because the etalon bandwidth is determined by the reflectivity of the etalon surfaces, which are not adjustable. Also, during tuning from one wavelength to another, the filter transmits a continuously shifting band of wavelengths until the new center wavelength is reached. This type of tuning is called "hitting", as the filter must sequentially hit each wavelength between the initial and final tuning positions. Finally, the fundamentals of etalon filter design impose restrictions on the spectral filter profile and do not allow, for example, an ideal square passband with uniform low loss across the allowed wavelengths and high extinction of the out-of-band signals.

A more complex type of prior-art spectral filter, which may be called a switched spectral-plane (SSP) filter, is based on a free-space optical spectrometer where the multiple wavelength input signal is imaged through a diffraction grating onto a spectrally demultiplexed image plane so that the lateral position of the signal corresponds to the incident wavelength. Passive free-space wavelength demultiplexing optical systems are described, for example, in the textbook entitled *Wavelength Division Multiplexing*, authored by Jean-Pierre Laude and published by Prentice Hall in 1994 as part of their International Series in Optoelectronics. Simple active versions of such free-space optical spectrometers use single-axis rotation control of the grating, as used for example in tunable wavelength lasers (e.g., J. Berger et al, "Widely tunable external cavity diode laser using a MEMS electrostatic rotary actuator," 27th European Conference on Optical Communication, Proceedings Vol. 2, pp. 198–199, 2001) but such control is limited to adjusting the center wavelength alignment of the system. In SSP filters, however, the passive spectrometer illuminates a linear array of independent optical actuators, which act to selectively switch or attenuate each spectral component of the multiple wavelength signals. A second pass through the free-space spectrometer optics can spatially recombine the switched or attenuated signals.

With reference now to FIG. 2, there is shown a specific example of such a prior art SSP filter 200 designed to provide arbitrary attenuation on each channel of a multi-wavelength signal for dynamic spectral power equalization. The basic concept of this SSP filter is disclosed in U.S. Pat. No. 5,745,271, for "Attenuation device for wavelength multiplexed optical fiber communications", issued to Ford on Apr. 28, 1998, and the physical configuration shown is disclosed in U.S. Pat. No. 6,307,657 for an "Optomechanical platform", which issued to Ford et al on Oct. 23, 2001.

With further reference now to FIG. 2, optical input signals are directed by input fiber 201 through an optical circulator 202 and enter a free-space optical system through input/output fiber 203. Light emitted from input/output fiber 203 is collimated by a first pass through lens 204 to illuminate a reflective diffraction grating 205. The diffraction angle is proportional to the wavelength, so grating 205 acts to separate each wavelength signal by angle. A second pass by the light through lens 204 to a spectrally dispersed plane 206 focuses the diffracted signals where each signal is vertically displaced according to the wavelength.

A micromechanical attenuation device 207, located at the spectrally dispersed plane, includes an array of individually controllable optical attenuators 208. Light which is reflected from the attenuator array retraces its input path as it is recollimated by a third pass through lens 204, diffracting again from grating 205, and finally focused back into the input/output fiber 203. For clarity, the arrows drawn in FIG. 2 indicate the first pass of the light through the optical system from input/output fiber 203 to attenuator array 208. On the return path from attenuator array 208 to input/output fiber 203 the direction of the light is reversed.

Attenuation device 207 may be designed so that each individual attenuator within optical attenuator array 208 absorbs a controlled portion of each wavelength signal, as described in the above-referenced U.S. Pat. No. 6,307,657. Other types of attenuation devices can also controllably reduce the amount of light that is coupled into the single mode output fiber 203.

Also shown in FIG. 2., is an attenuator device 207 that includes an attenuator array 208, having a linear array of tilting micro-mirrors, controlled by external electrical connections 209. When one individual micro-mirror of the attenuator array 208 is tilted, the corresponding wavelength signal imaged in a second pass through the optical system is incident on input/output fiber 203 at a controlled angle relative to the fiber face. The efficiency of coupling into the fiber depends on angle of incidence, so a controlled tilt of the micro-mirror controllable reduces the output power of the corresponding wavelength signal coupled back into the input/output fiber 203. Finally, the backwards-propagating output signals pass through the optical circulator 202 and are directed into a separate output fiber 210. Fiber optic components based on variations of this design are commercially available as, for examples, the Dynamic Channel Equalizer, marketed and sold by LightConnect, Inc., and the "Agile-Wave" (TM) Dynamic Spectral Equalizer, marketed and sold by Cidra, Inc.

As can be appreciated, SSP-type filters can provide wavelength switching as well as attenuation. An analog tilt mirror can be used to direct the demultiplexed signals into two or more distinct output paths, such that each wavelength signal is independently controlled. A wavelength add/drop switch which allows any combination of signals to be extracted from a multi-wavelength transmission and replaced with different data signals on the same wavelengths is described in U.S. Pat. No. 6,204,946, "Reconfigurable wavelength division multiplex add/drop device using micromirrors." A related system which allows arbitrary 2×2 switching is described in U.S. Patent Publication No. US 2002/0009257 A1, entitled "Optical configuration for a dynamic gain equalizer and a configurable add/drop multiplexer" published Jan. 24, 2002. Finally, a system which allows arbitrary 1×4 switching is described by D. Marom in a conference paper presentation at the 2002 OSA/IEEE Optical Fiber Communications Conference, the presentation entitled, "Wavelength-selective 1×4 switch for 128 WDM channels at 50 GHz spacing," which was published in the Postdeadline Proceedings pages FB7-1–3, in March 2002.

SSP filters offer a more versatile platform for spectral manipulation than simple FP filters, but this increased functionality comes at a cost in terms of optomechanical system packaging and control electronics. In particular, components that achieve switching or filtering at the individual wavelength channel level must maintain accurate alignment of the dispersed spectrum onto the corresponding switch elements to within a fraction of the channel pitch, which is typically 100 GHz pitch (0.8 nm) or even 50 GHz (0.4 nm). The minimum individual switch size of micromechanical and liquid crystal modulators is typically larger than the 10 micron mode field diameter of single mode optical fiber, making very fine wavelength pitches difficult to achieve without magnification. Also, a significant portion of the device area is dedicated to actuators (torsion bars or hinges) or close to the feature edges, and so is not optically usable, resulting in notches or gaps in the spectral response of the filter in the narrow bands between WDM communication channels. These gaps become problematic when multiple SSP filters, each with slightly different registration of the switching windows, are cascaded. Achieving a flat transmission passband over the channel transmission window, which is roughly half of the channel pitch, can force systems designers to use long focal length lenses (around 100 mm). Large optical systems that maintain micron-scale alignment over all temperatures and over the 20 year installed life of such components are expensive. Active temperature stabilization or feedback alignment systems are possible, but also incur manufacturing and operating costs. Therefore, SSP filters are highly functional but not inexpensive or compact.

A need therefore exists in the art for an inexpensive dynamic spectral filter that provides greater functionality than a FP tunable filter without the complexity and cost of a full SSP filter.

SUMMARY OF THE INVENTION

We have invented an optical spectral filtering device and associated method for selectively separating portions of a wavelength multiplexed input signal, entering through an optical fiber, into one or more output signals provided to one or more optical output fibers or as one or more electronic outputs. The optical filtering is accomplished using free-space diffractive wavelength demultiplexing and remultiplexing optics similar to those used in SSP filters. However, the spectrally dispersed image plane does not contain an array of active switching elements. The disclosed filter instead positions at the spectrally dispersed image plane a fixed micro-optic element, a permanent patterned spectral-plane structure, which may contain a permanent spatial pattern for reflecting, absorbing, or redirecting a selected portion of the multi-wavelength signal, and may also contain optical outputs and optical power detectors for accepting or measuring a selected portion of the multi-wavelength signal.

The portion of the multi-wavelength optical signal that illuminates a particular location on the permanent (static) spectral-plane structure is controlled by changing the relative position of the dispersed input spectrum and the spectral plane structure at the spectrally-dispersed image plane by laterally shifting the position of either the spectrum, the structure, or some combination of the two. In other words, rather than switching and filtering by controlling an array of active elements at the spectrally-dispersed image plane, as done in SSP filters, here a static filter is used to apply different transmission functions by controlling the relative position between the static filter and the illuminating spectrum. This relative position may be controlled by introducing a tilt into the propagating multi-wavelength beam, e.g. by reflecting the collimated multi-wavelength beams from a mirror mounted on a tilt stage, or by laterally translating the spectral-plane structure with respect to a stationary multi-wavelength beam, e.g. by mounting the spectral plane structure on a translation stage. The tilt or shift can be introduced in either one or two dimensions, so as to control the position of the dispersed spectrum relative to the spectral filter in either one or two lateral dimensions.

The spectral-plane structure may include multiple patterns, such that a relative lateral shift of the entire dispersed spectrum and the structure may be used to select between the different patterns and to control the center wavelength which illuminates the selected pattern. The sequence with which the lateral shifts are introduced, in combination with the shape of the spatial pattern of the spectral-plane structure, determine the time evolution of the filtered spectrum. The patterned structure can be designed to provide "blank" regions over which there is little or no change in the output signals as the spectrum is shifted, allowing the spectrum to be moved away from a particular filter, then translated to a new filter without change to the remainder of the output signal.

In one embodiment of the invention, a variable-bandwidth tunable optical spectral power meter is constructed using an optical power detector with a fixed wedge-shaped aperture to detect a portion of a wavelength multiplexed input signal, and a tilt-mirror is used to control the signal entering the detector, such that rotating the mirror about one axis will adjust the center wavelength of the signal being detected, and rotating the mirror about the orthogonal axis adjusts the spectral width of the signal being detected. In a further embodiment of the invention, a separate fiber optic spectral filter output is provided, and mirror tilt is used to select between optical and electronic output modes.

BRIEF DESCRIPTION OF THE DRAWING

In the following description, identical element labels in different figures represent identical elements. Additionally in the element descriptions, the first digit refers to the figure in which that element is first located (for example, 101 is located in FIG. 1).

DETAILED DESCRIPTION OF THE INVENTION

Figure 3:
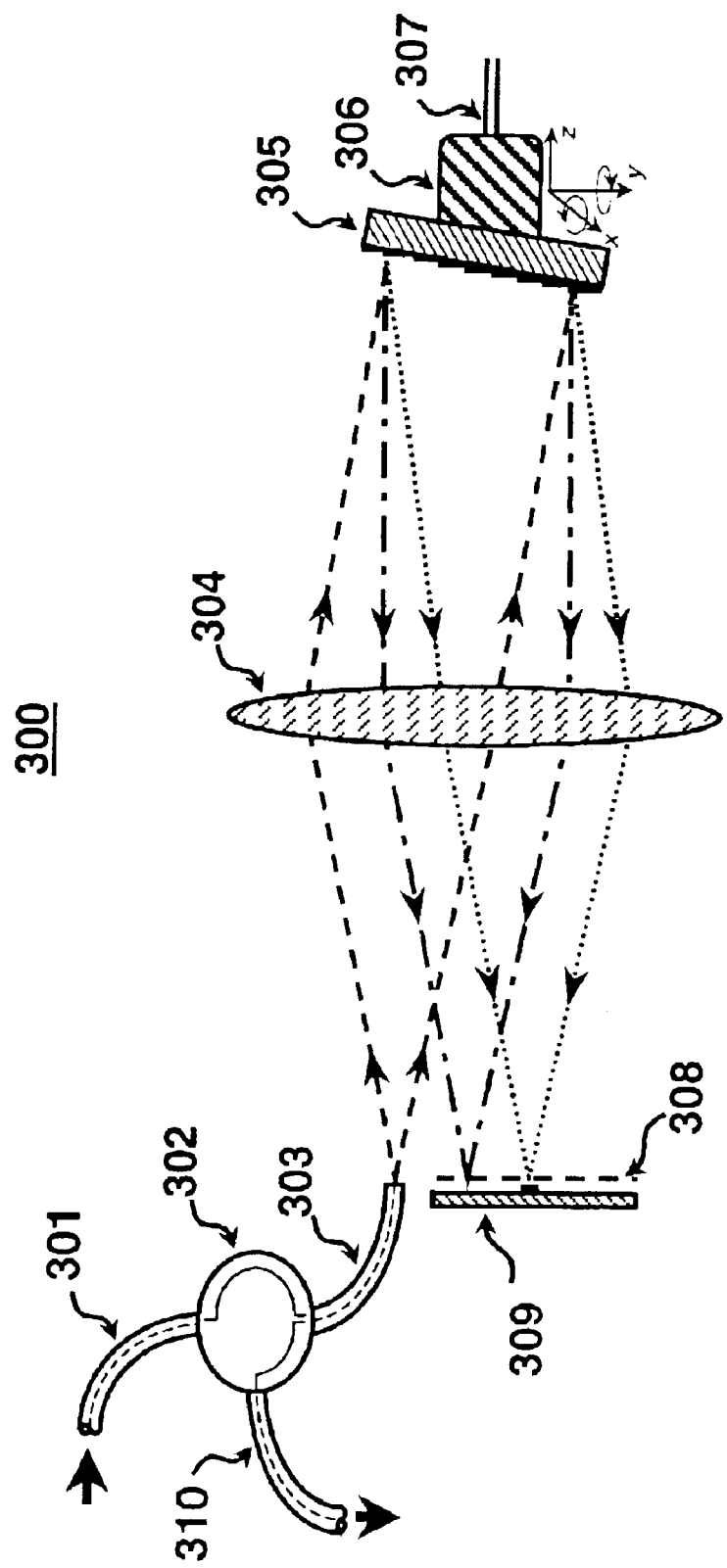
FIG. 3 shows a spectrum steering filter in accordance with the current invention.

FIG. 3 illustrates the basic concept of our invention. With reference now to that FIG. 3, and specifically optical system 300, multiple wavelength optical input signals are carried on optical fiber 301 through optical circulator 302 to input/output fiber 303. Light emitted into a free-space volume by input/output fiber 303 is collimated by lens 304 and illuminates a reflective diffraction grating 305 which is mounted on a tip/tilt stage 306 capable of controllably rotating grating 305 about an X-axis and Y-axis as directed by electrical signals received via electrical connections 307. Each wavelength signal is diffracted by grating 305 at a distinct angle corresponding to the signal wavelength. The diffracted signals are focused by a second pass through lens 304 and are imaged onto a spectrally-dispersed image plane 308 to illuminate a permanent spectral-plane optical filter 309, which is patterned so as to selectively reflect, absorb, deflect, or detect, a portion of the spectrally-dispersed multiwavelength signal.

Figure 1:
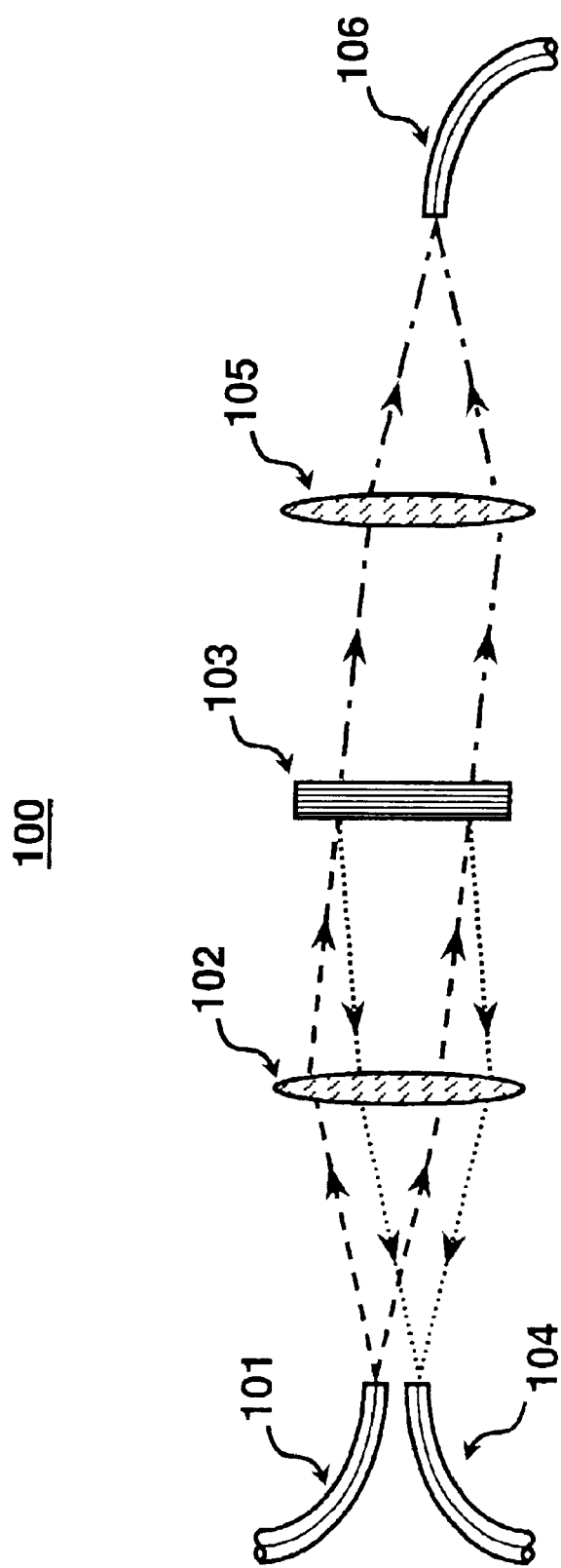
FIG. 1 shows a prior art Fourier-plane filter component.
Figure 2:
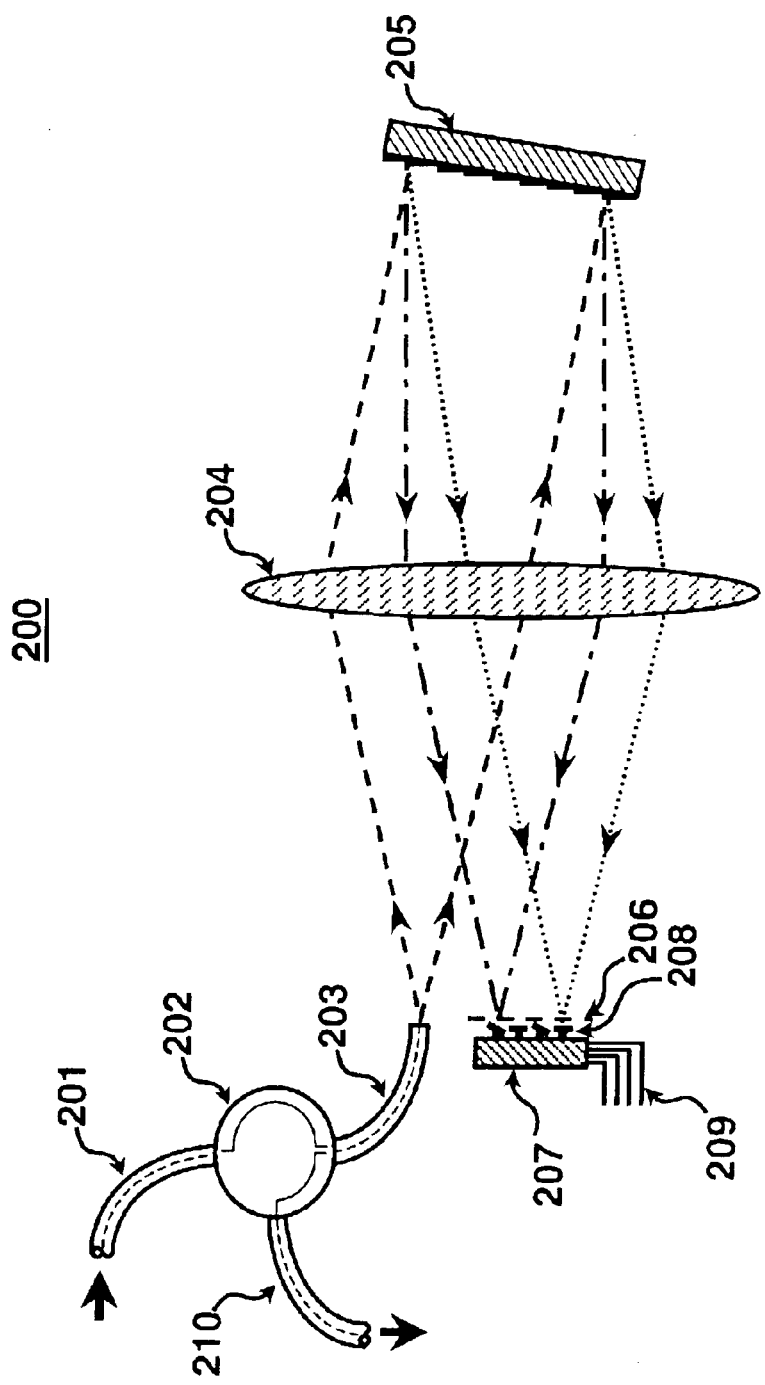
FIG. 2 shows a prior art switched spectral-plane filter component.

As can be recalled from the prior-art SSP filter shown in FIG. 2, and with simultaneous reference now to that FIG. 2., an active device array 207 with electrical controls 209 is positioned in the spectrally-dispersed plane 206. In sharp contrast, there is no such active device necessary or included in the current invention. More specifically, the permanent spectral-plane structure 309 has no electrical controls to change the effect it has upon the multiwavelength optical signal. As can now be appreciated by those skilled in the art, instead of changing the filter, the lateral position of the entire dispersed spectrum is adjusted as a result of electrical signals received via electrical connections 307 so as to align the desired wavelength signal with the stationary features of the permanent spectral-plane structure.

In the structure shown in FIG. 3, the lateral position of the dispersed spectrum is controlled by tip/tilt stage 306 to rotate grating 305 to the appropriate angle around its X-axis and Y-axis. Tilt of the collimated beam translates into lateral shift of the dispersed spectra at the dispersed spectral image plane 308. Regardless of the lateral shift of the dispersed spectrum, light which is reflected by the spectral-plane filter 309 retraces the input path as it is recollimated by a third pass through lens 304, diffracting again from grating 305, and is focused back into the input/output fiber 303. For clarity, the arrows drawn in FIG. 3 indicate the first pass of the light through the optical system from input/output fiber 303 to spectral-plane filter 309. On the return path from spectral-plane filter 309 to input/output fiber 303, the direction is reversed.

Figure 4A:
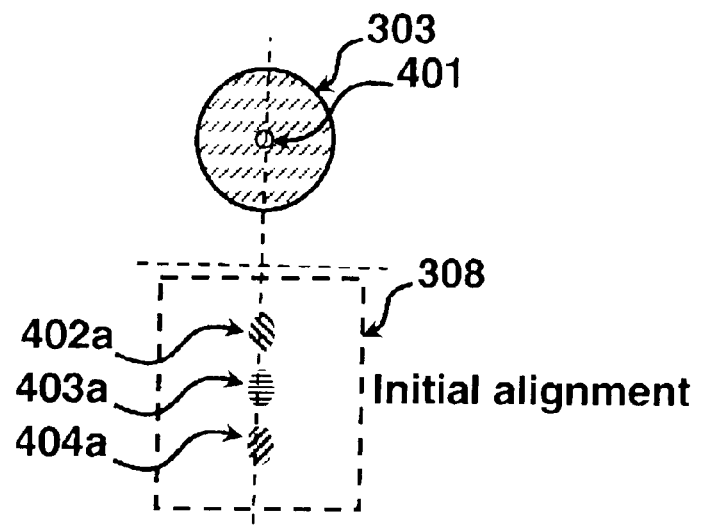
FIGS. 4a to 4c show the effect of grating tilt on the spectrally dispersed image.
Figure 4B:
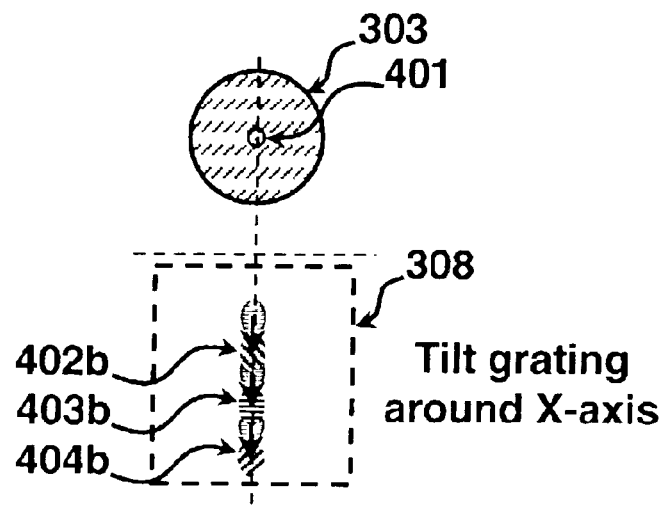
Figure 4C:
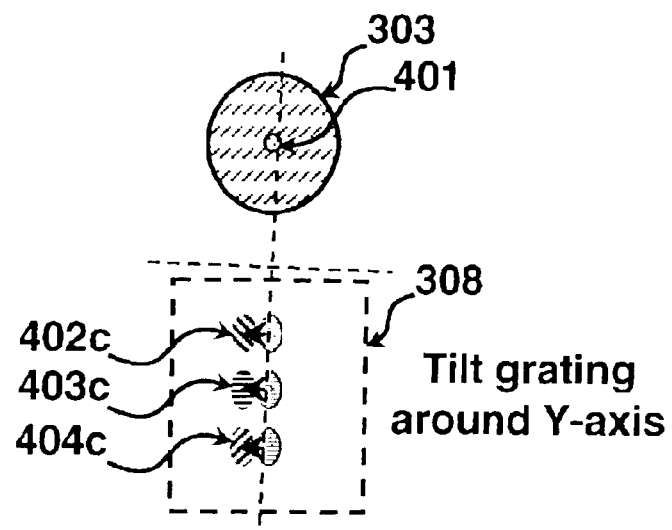

The operation of laterally shifting the spectrum is understood with reference to FIGS. 4a–4c, which show the face of input/output fiber 303 such that the central single mode optical fiber core 401 is visible. The dispersed spectral-plane 308 is positioned below the input/output fiber 303 by appropriate initial alignment of the optical system. Three wavelength signals 402, 403 and 404 (shown as 402a, 403a, and 404a; 402b, 403b, and 404d; and 402c, 403c and 404c in FIG. 4A, FIG. 4B and FIG. 4C, respectively. For the purposes of illustration, 403(a–c) are drawn corresponding to 1530 nm, 1540 nm, and 1550 nm wavelengths respectively. Additionally, while the dispersed spectral plane is shown positioned below the input/output fiber, it is not necessary that such positioning is required. More specifically, any relative orientation is contemplated and satisfactory for the purposes of the present invention.

With simultaneous reference now to FIGS. 3 and 4(A–C), the three wavelength signals are all emitted from the single mode fiber core 401, where they overlap. After making a first pass through the spectral demultiplexing system 300 the three signals are imaged into a column of spots in the spectrally demultiplexed plane 308, where the vertical position of each spot is approximately proportional to signal wavelength. In the initial alignment state of the system shown in FIG. 4a, the column of spots 402a, 403a and 404a is centered in the spectrally demultiplexed plane 308. FIG. 4b shows the result when the reflective grating 305 is rotated about the X-axis. The spots have the same position relative to each other, but each spot is vertically shifted to new positions 402b, 403b and 404b. FIG. 4c shows the result when the reflective grating 305 is rotated about the Y-axis. The spots have the same position relative to each other, but each spot is laterally shifted to new positions 402c, 403c and 404c. This type of actuation may be described as "spectrum steering", as the input spectrum is steered to the required position on the permanent spectral-plane structure, as opposed to changing the filter itself. Therefore this type of filter can be descriptively called a spectrum steering filter (SSF).

FIG. 5 shows several exemplary means for applying tilt to the reflected multi-wavelength signal. There exists a substantial body of engineering expertise in optical beam scanning systems, as described for example in the book "Optical Scanning", authored by Gerald Marshall, Ed., and published by Marcel Dekkar, Inc. in 1991. It is understood that one skilled in the art would be able to draw upon the prior art of such systems to construct related means for accomplishing substantially identical functions.

Figure 5A:
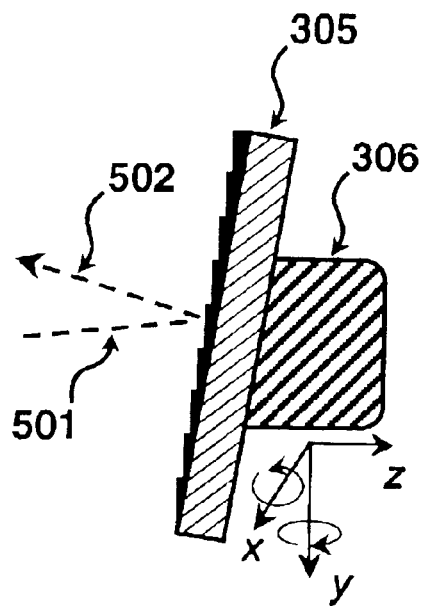
FIGS. 5a to 5d show configurations for steering a spectrally dispersed beam.
Figure 5B:
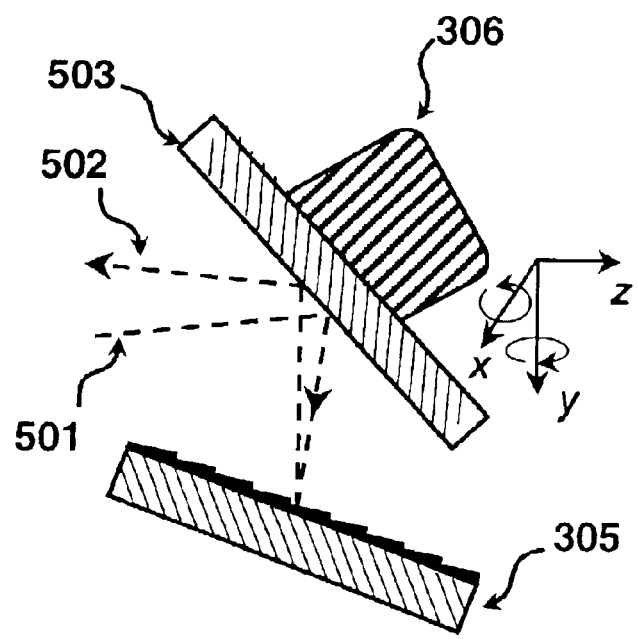
Figure 5C:
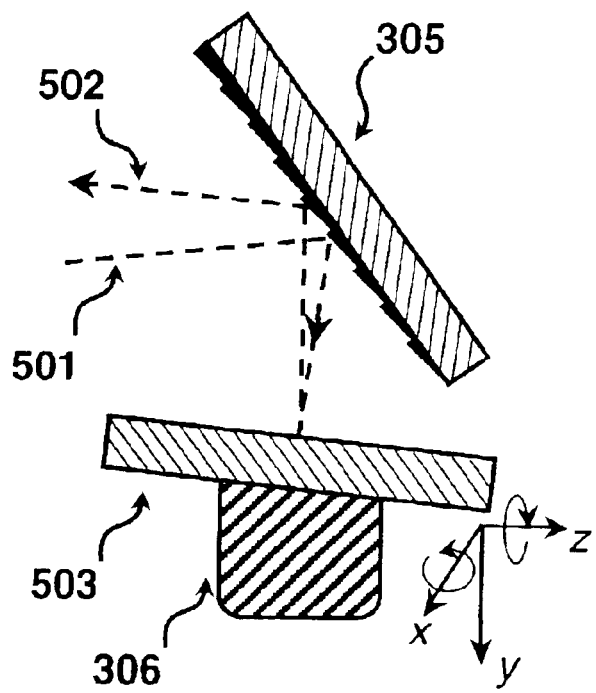

Referring now to FIG. 5a, there is shown an illustrative single wavelength input beam 501 incident on reflective diffraction grating 305 which is mounted directly on 2-axis tip/tilt mount 306 used to control the direction of the diffracted output signal 502. In FIG. 5b input beam 501 is reflected from a first-surface mirror 503 mounted on tip/tilt stage 306 and to illuminate reflective diffraction grating 305, now stationary, such that the diffracted output signal 502 reflects again from mirror 503. As in FIG. 5a, the tip/tilt stage controls the direction of the diffracted output, but in this configuration the output angle is approximately twice as sensitive to tip/tilt stage angle as in FIG. 5a. In FIG. 5c, the input signal 501 is diffracted from stationary reflective diffraction grating 305 and illuminates first surface mirror 503 mounted on tip/tilt stage 306. Mirror 503 is oriented so that the reflected signal is incident on reflective diffraction grating 305 where it diffracts a second time. This configuration provides approximately twice the change in output angle as a function of input wavelength (spectral dispersion) as in configurations shown in FIGS. 5a and 5b.

Figure 5D:
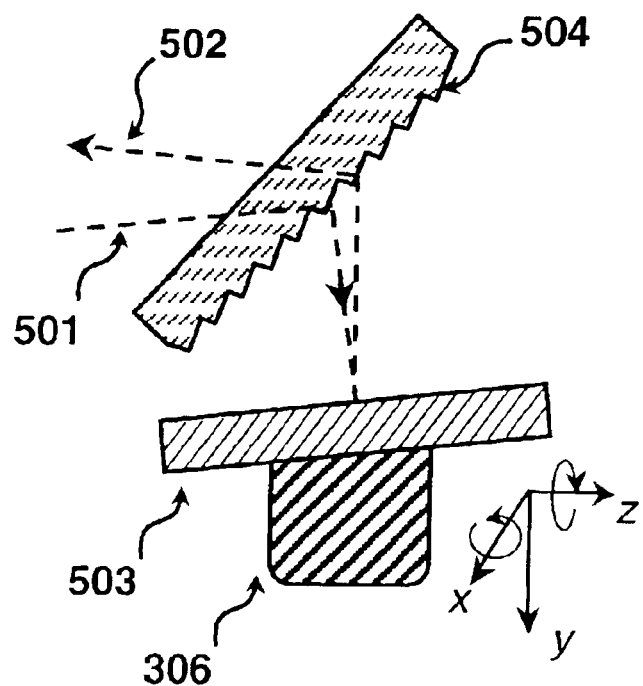

In FIG. 5d, input signal 501 is diffracted in passing through transmissive diffraction grating 504 then is incident upon first surface mirror 503 mounted on tip/tilt stage 306. The reflected signal is diffracted again by a second pass through transmissive grating 504 to output 502. In configurations 5c and 5d, where the scanned surface is the second reflective surface, rotation of the tip/tilt stage about the z axis controls lateral position of the imaged dispersed signals 402, 403 and 404 drawn in FIG. 4.

In each of the systems shown in FIGS. 5(a–c), the active moving element can be actuated by any of the means known in the art of optical scanning including, for examples, stepper motor driven screws, piezoelectric direct or screw drive actuators, torsional galvanometric actuators, thermal expansion actuation, and direct manual actuators. Other means known in the art for optical beamsteering include micro-electro-mechanical systems (MEMS) actuators such as the devices used for constructing large port-count optical crossconnects. Such crossconnects typically involve two dimensional arrays of dozens or hundreds of 2-axis gimbal-mounted beamsteering mirrors, where electro-magnetic or electrostatic actuators control each mirror. In the current invention only a single, relatively large diameter, tilt-mirror is required but the same fabrication and drive techniques are applicable.

The permanent spectral-plane structure can be constructed using any of a variety of techniques developed in prior art for directing a beam of light. Turning our attention now to FIG. 6, there is shown six examples constructed on planar glass substrates, although substantially identical concepts can be implemented using curved or planar substrates made of metal, ceramic, plastic, semiconductor or crystal materials.

Figure 6A:
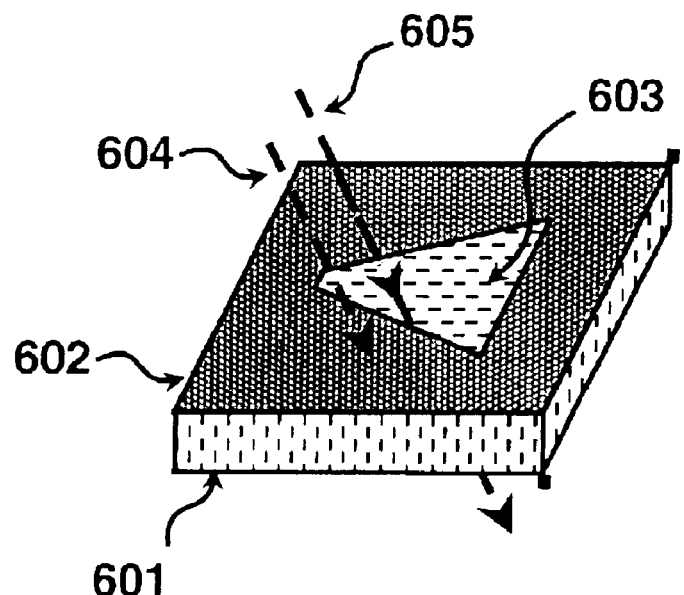
FIGS. 6a to 6f show various types of permanent spectral-plane structures.

In particular, FIG. 6a shows an absorption-based filter where a substrate 601 is coated with an absorptive layer 602 patterned with a single wedge-shaped feature 603 such that an optical beam 604 that is incident on the coated substrate will be absorbed, while an adjacent optical beam 605 incident on the aperture is transmitted through the substrate.

Figure 6B:
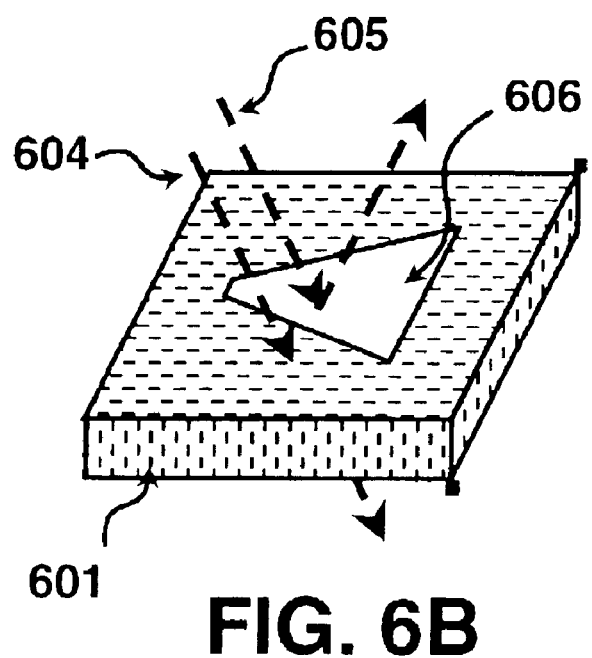

FIG. 6b shows a reflection-based filter wherein the substrate 601 is patterned with a wedge shaped reflective feature 606, made for example with a metal or dielectric multilayer film, such that an optical beam 604 which is incident on the uncoated substrate will be transmitted through the substrate, while an adjacent optical beam 605 incident on the patterned feature will be reflected.

Figure 6C:
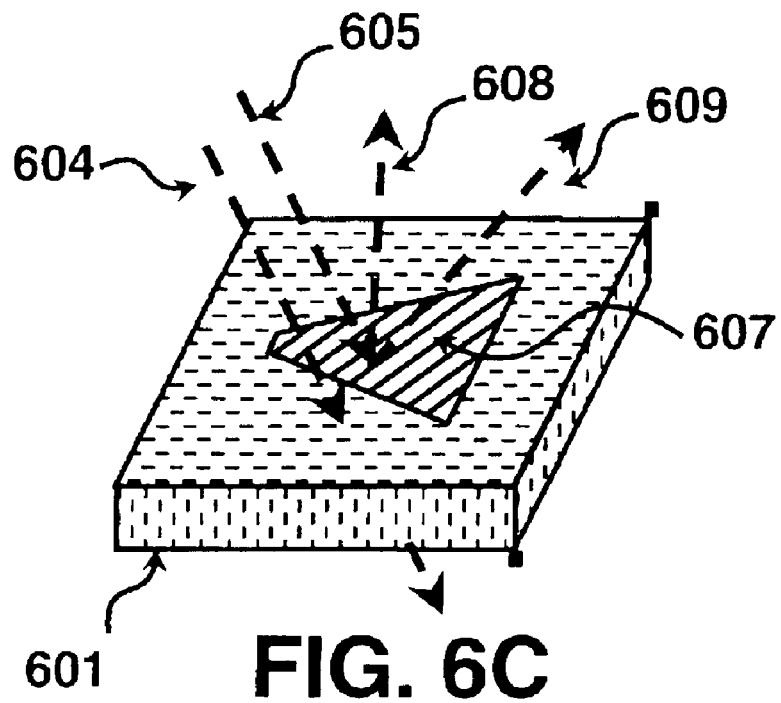

FIG. 6c shows a diffractive-based filter where a substrate 601 is patterned with a wedge-shaped region of reflective diffraction grating, such that an optical beam 604 which is incident on the uncoated substrate will be transmitted through the substrate, while an adjacent optical beam 605 incident on the reflective diffraction grating will be reflected and diffracted into one or more directions. In the example shown in FIG. 6c, the incident signal 605 is split and diffracted into two output signals 608 and 609. Such a diffraction grating may be made, for examples, with a holographically-recorded sinusoidal metal-coated analog surface relief profile, or a lithographic digital computer-generated diffraction pattern. The same concept can also be implemented using a transmissive phase diffraction grating that would redirect the transmitted optical signals.

Figure 6D:
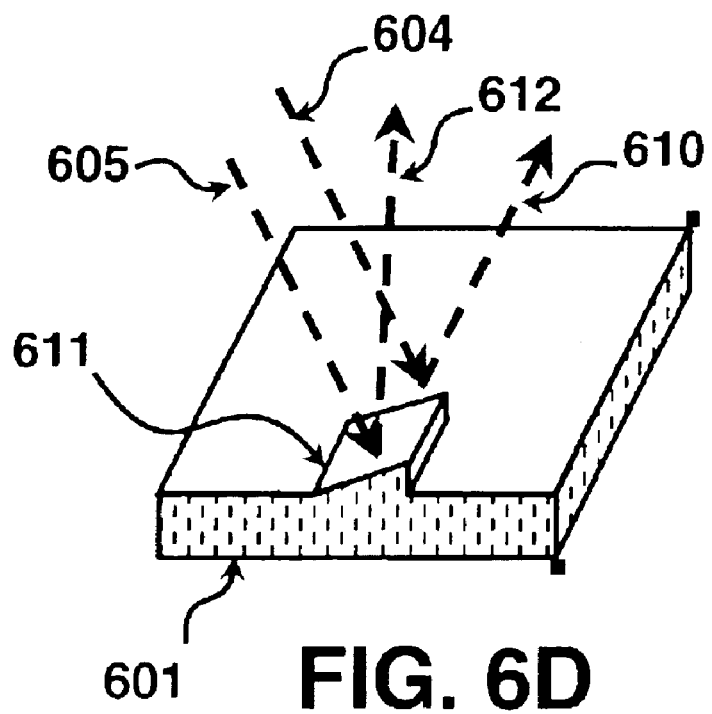

FIG. 6d shows a reflection-based filter where a substrate 601 is fabricated with a surface relief profile then uniformly coated with a reflective layer such that an optical beam 604 which is incident on the flat portion of the substrate will be reflected into an output 610 symmetric about the surface normal, while an adjacent optical beam 605 incident on the patterned tilted feature 611 will be reflected into an output 612 propagating in an different direction determined by the surface normal of the tilted region.

Figure 6E:
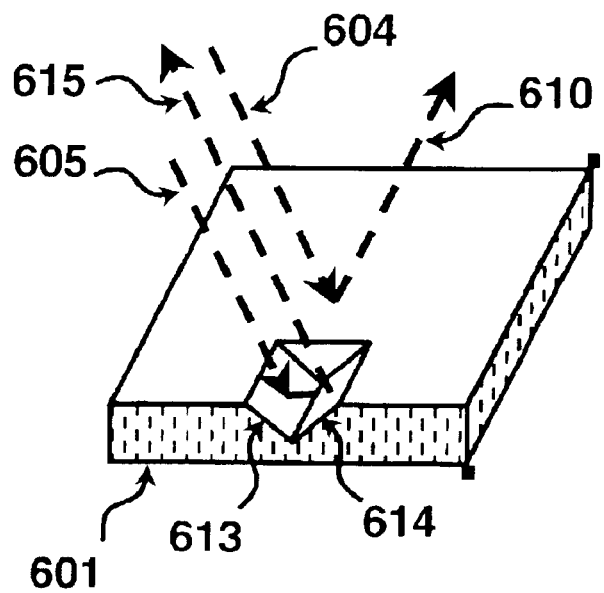

FIG. 6e shows a different reflection-based filter using a more complicated two-bounce concept where a substrate 601 is fabricated with a surface relief profile then uniformly coated with a reflective layer such that an optical beam 604 which is incident on the flat portion of the substrate will be reflected into an output 610 symmetric about the surface normal, while an adjacent optical beam 605 incident on the patterned tilted feature 613 will be reflected off the adjacent patterned surface feature 614 and then reflected into an output 615 propagating in an different direction determined by the orientations of the two surface features. In the example drawn in FIG. 6e, the surfaces are oriented at 45° to the substrate normal such that the output signal 615 propagates backwards to the incident signal 605.

Figure 6F:
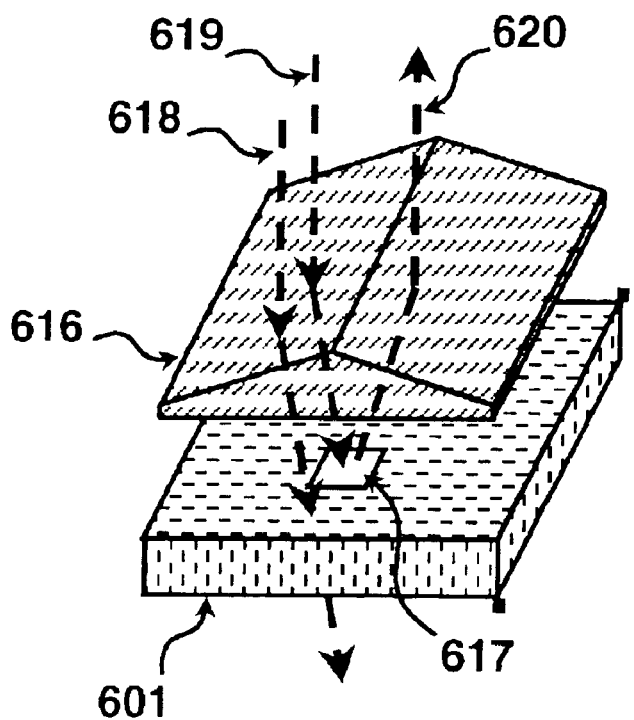

Finally, FIG. 6f shows a two-element filter composed of a roof prism 616 supported above a substrate 601 having a patterned reflector 617 such that an incident optical beam 618 will refract from a first facet of the roof prism and then be transmitted through the substrate, while an adjacent optical beam 619 will refract from a first facet of the roof prism then be reflected and refracted from a second facet of the roof prism into output signal 620. In the example drawn in FIG. 6f, the roof prism angles and separation from the substrate have been designed so that the output signal 620 is laterally shifted but substantially counterpropagating relative to the incident signal 619.

The patterned features shown in FIGS. 6(a–f) can be created using known techniques in semiconductor device processing. For example, the absorptive filter of FIG. 6a can be fabricated using, for example, evaporative deposition of metal oxides followed by lithographic patterning and selective removal of a wedge-shaped region of oxide to reveal the underlying substrate. It should be further understood that the wedge-shaped feature used in several of the examples of FIGS. 6(a–f) was chosen for illustration purposes only, and that the same concepts can be applied to implement arbitrary surface profiles, including both digital (binary) and analog (gray-scale) features. An example of gray-scale features would be a partially reflective coating (as in FIG. 6b), or an angled reflective feature with continuously varying slope (in FIG. 6d). It should also be understood that combinations of the concepts shown individually in FIGS. 6(a–f) are also possible, combining for example FIG. 6a and FIG. 6b to obtain a patterned tilted reflective layer on a largely absorptive filter.

Figure 7:
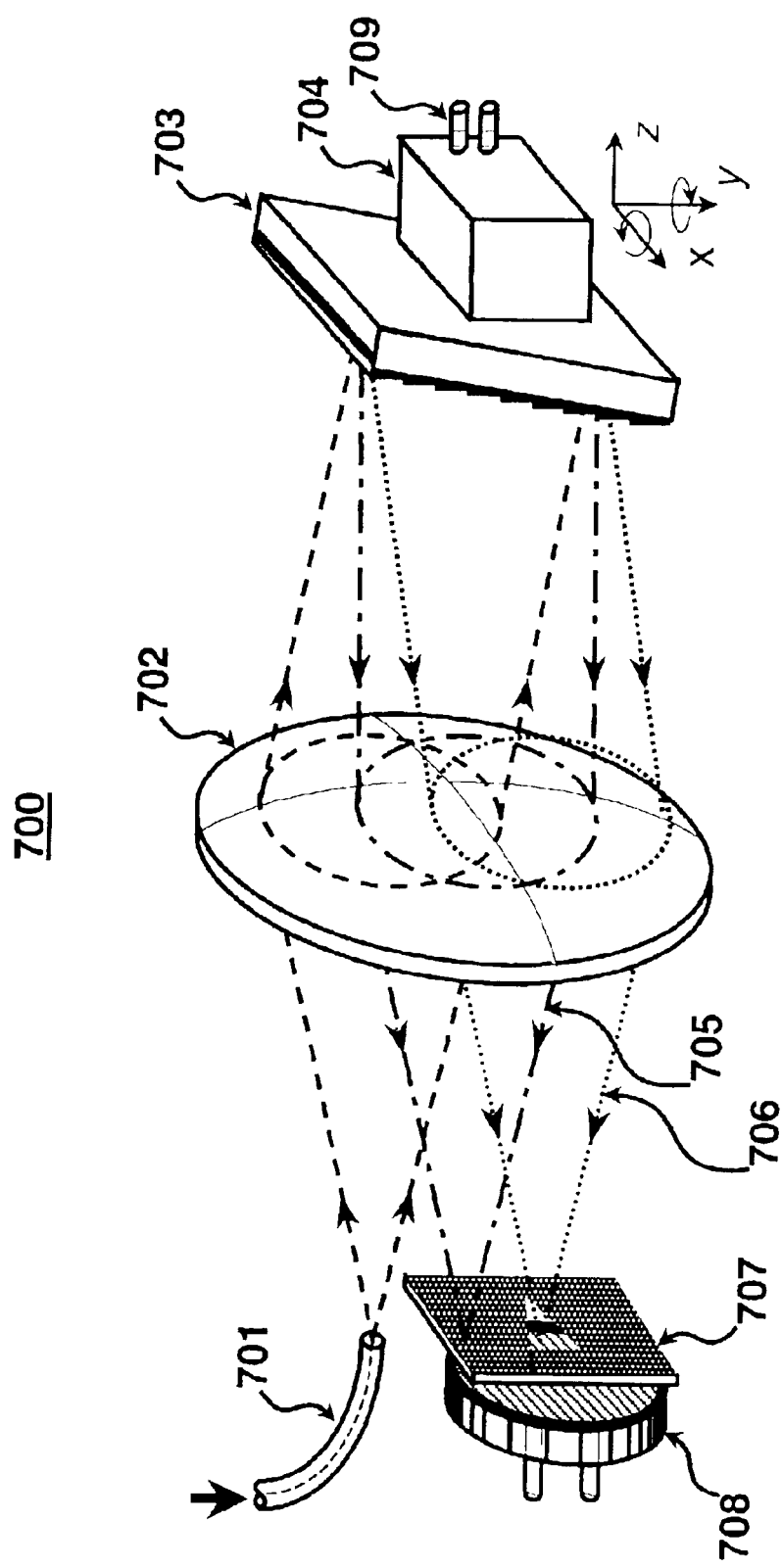
FIG. 7 shows a single-passed tunable-bandwidth spectral filter with electrical output.

An embodiment of the spectrum steering filter is the variable-bandwidth tunable optical spectral power meter 700 shown in FIG. 7 With reference to that FIG. 7, a multiwavelength input signal carried on input fiber 701 is collimated by lens 702 and illuminates a planar reflective diffraction grating 703 mounted on tip/tilt stage 704 capable of rotating grating 703 about its X-axis or Y-axis. Each wavelength signal beam is diffracted into an angle corresponding to its wavelength; for illustration, two wavelength signals 705 and 706 are drawn using a dashed and dotted lines, respectively. All signals are focused by a second pass through lens 702 and are imaged onto a permanent spectral-plane structure 707 similar to the one shown in FIG. 6a, with an absorptive layer covering a glass substrate everywhere except for a wedge-shaped aperture. As can be readily appreciated, a broad spectrum signal would be imaged into a continuous column of spots on the face of the permanent spectral-plane structure.

As shown in FIG. 7., the wavelength signal 705 is imaged onto the absorptive region and is absorbed, while the wavelength signal 706 is imaged onto the clear region and is transmitted through the transparent glass substrate to illuminate an optical power detector 708 located immediately behind the wedge-shaped aperture. In operation, the tip/tilt stage is controlled by electrical connections 709. Rotating stage 703 around its X-axis will steer the dispersed spectral pattern illuminating the permanent spectral-plane structure to shift vertically, and modify the center wavelength of the signal entering detector 708. Rotating stage 703 around its Y-axis will cause the dispersed spectral pattern illuminating the permanent spectral-plane structure to shift laterally (as drawn, into and out of the page), and modify the wavelength bandwidth of the signal entering detector 708.

Figure 8A:
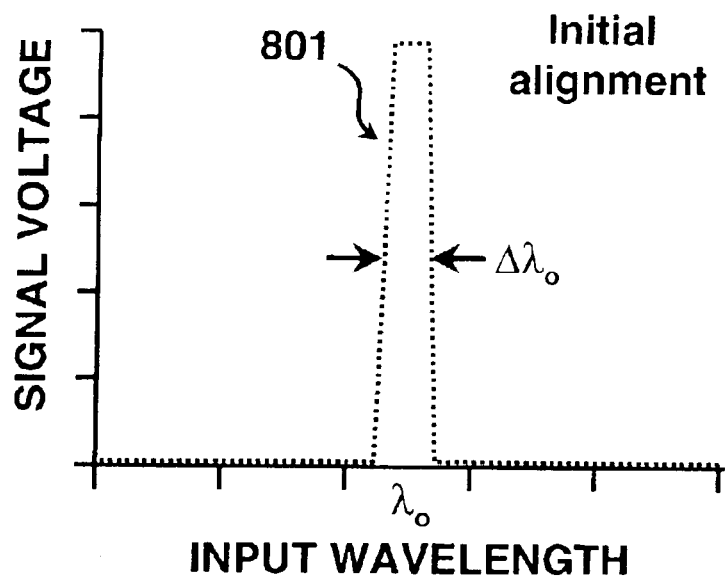
FIGS. 8a to 8c show graphs of the detected spectrum during filter operation.
Figure 8B:
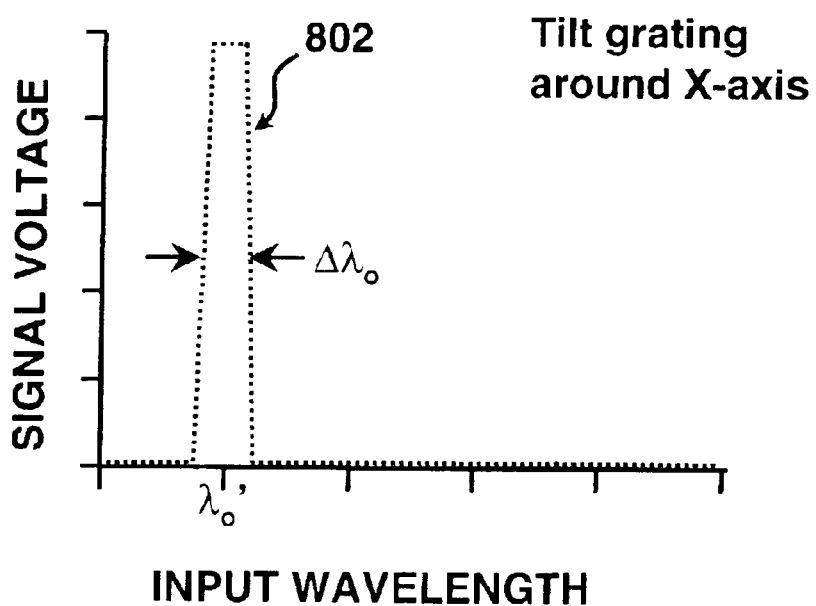
Figure 8C:
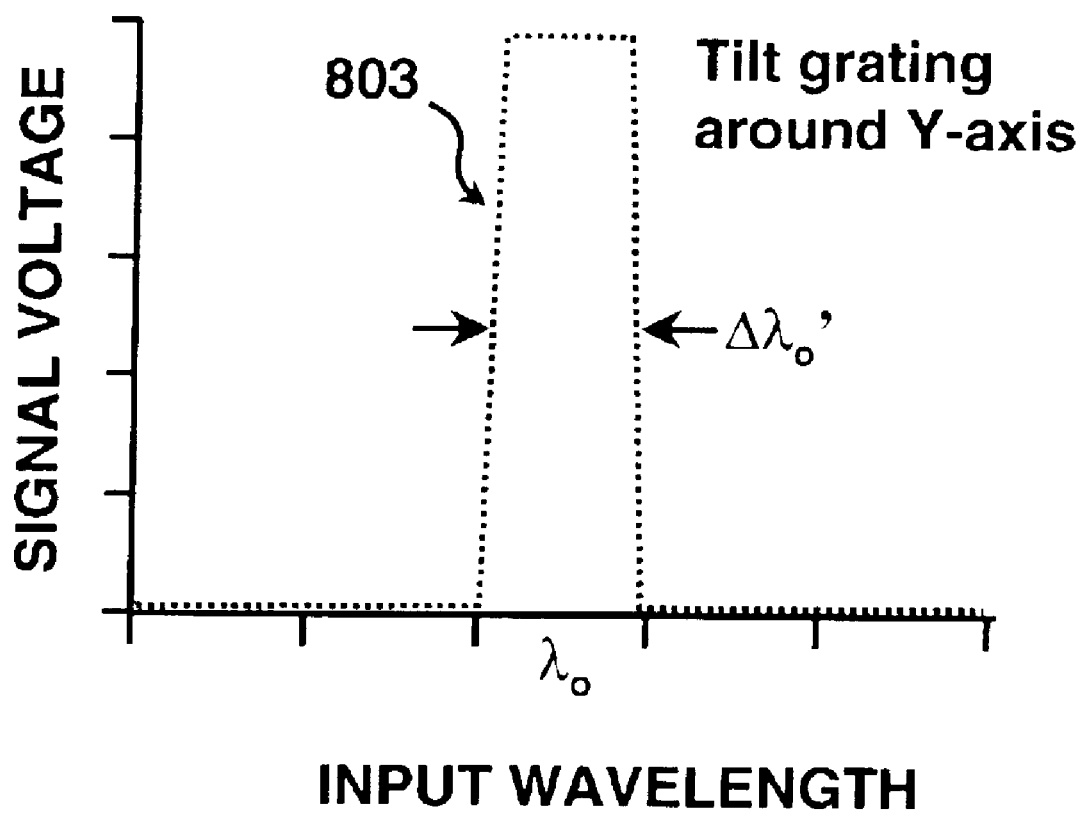

FIGS. 8a to 8c shows graphs of the spectral response (the signal intensity as a function of signal wavelength) for tunable filter 700 during its operation. FIG. 8a shows the spectral response in the initial alignment of the system. The graph shows a characteristic spectral peak 801 with a spectral bandwidth (labeled $\Delta\lambda_o$) and center wavelength (labeled $\lambda_o$) near the center of the spectral response curve. When diffraction grating 703 is rotated around its X-axis, the spectral response peak 802 shown in FIG. 8b is shifted to a lower center wavelength $\lambda_o'$, but the shape and spectral bandwidth $\lambda_o$ is unchanged.

However, if instead of rotating the filter around its X-axis, the filter is rotated around its Y-axis the spectral response peak 803 shown in FIG. 8c is unchanged in center wavelength $\lambda_o$ and is instead changed in spectral bandwidth to a new value $\lambda_o'$ determined by the width of the illuminated portion of the wedge-shaped aperture.

Figure 9:
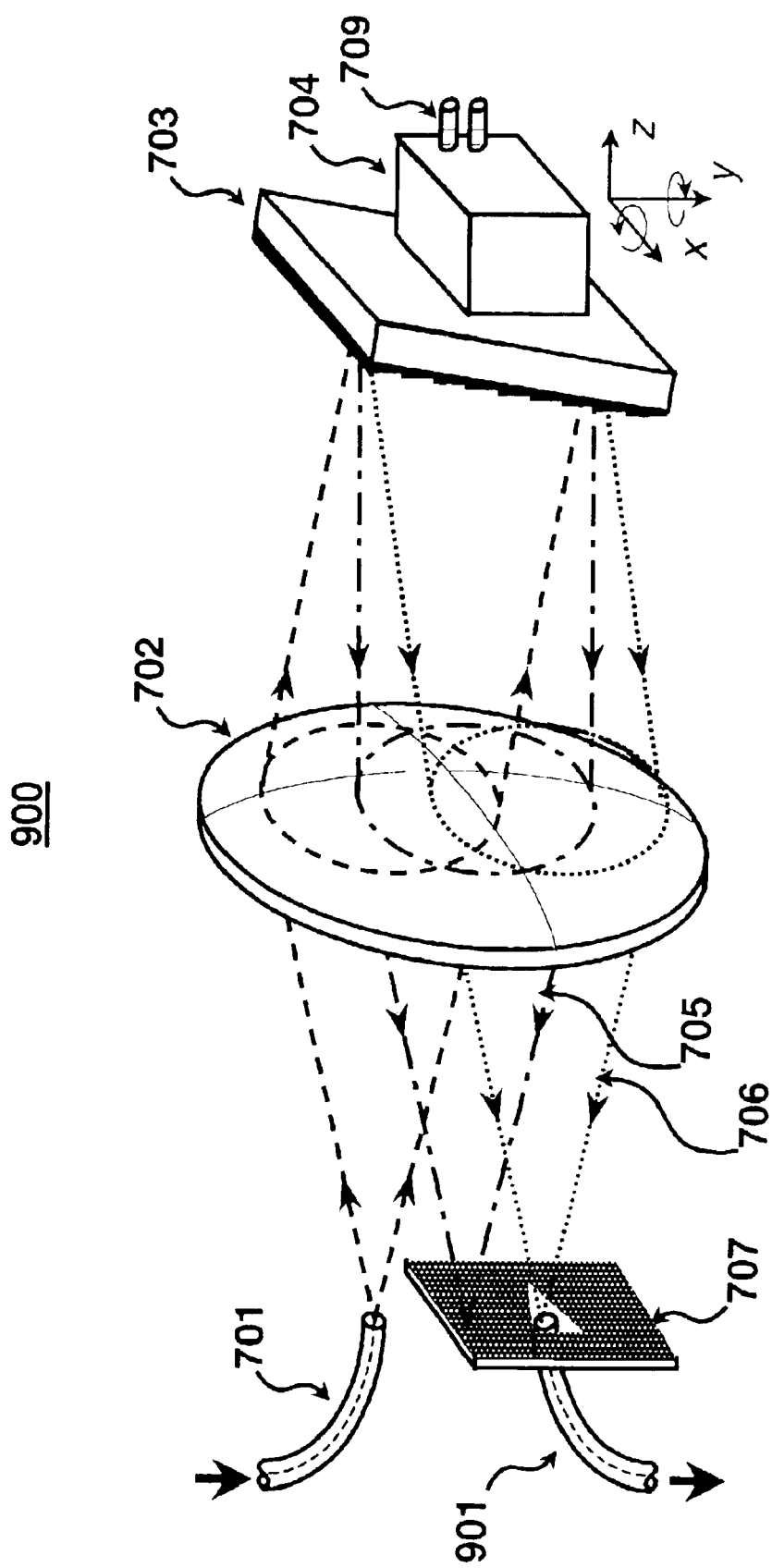
FIG. 9 shows a single-passed tunable-bandwidth spectral filter with optical output.

A second embodiment of the spectrum steering filter is the variable-bandwidth tunable spectral filter with optical output 900 shown in FIG. 9. As in the optical filter with electronic output 700, a multiwavelength input signal carried on input fiber 701 is collimated by lens 702 and illuminates a planar reflective diffraction grating 703 mounted on tip/tilt stage 704 capable of rotating grating 703 about its X-axis or Y-axis. Each wavelength signal beam is diffracted into an angle corresponding to its wavelength; for illustration, two wavelength signals 705 and 706 are drawn using a dashed and dotted lines, respectively. All signals are focused by a second pass through lens 702 and are imaged onto a permanent spectral-plane structure 707, similar to the one shown in FIG. 6a, with an absorptive layer covering a glass substrate everywhere except for a wedge-shaped aperture.

By way of example, a broad spectrum signal would be imaged into a continuous column of spots on the face of the permanent spectral-plane structure. As drawn, the wavelength signal 705 is imaged onto the absorptive region and is absorbed, while the wavelength signal 706 is imaged onto the clear region and is transmitted through the transparent glass substrate. In place of the electronic detector of system 700, the signal that is transmitted through the aperture is received by an optical output fiber 901 that carries the output signal.

Figure 10A:
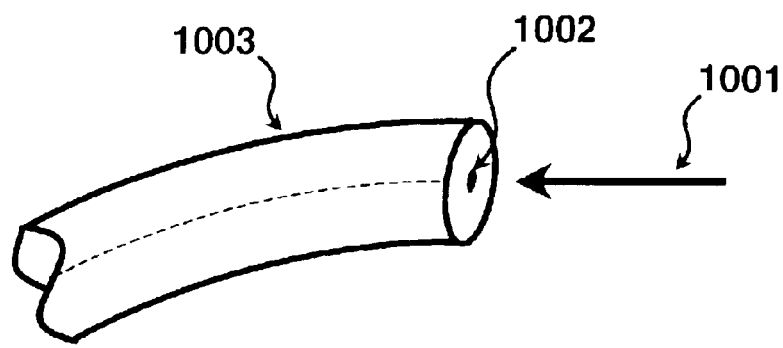
FIGS. 10a to 10c show configurations for guiding the optical output.

The output fiber 901 may be a simple end-polished single mode fiber, as shown in FIG. 10a. However, signals at the dispersed spectral-plane with significant wavelength bandwidth cover an area which is large compared to the mode field diameter of single mode fiber, and so will not couple with uniform efficiency into a simple end-polished single mode fiber. Several possible configurations for optical coupling are shown in FIGS. 10(a–c).

FIG. 10a shows a single wavelength signal 1001 incident on the central core 1002 of a single mode optical output fiber 1003. Signals which are laterally misaligned from the core by more than substantially 10 microns will not couple into the output fiber.

Figure 10B:
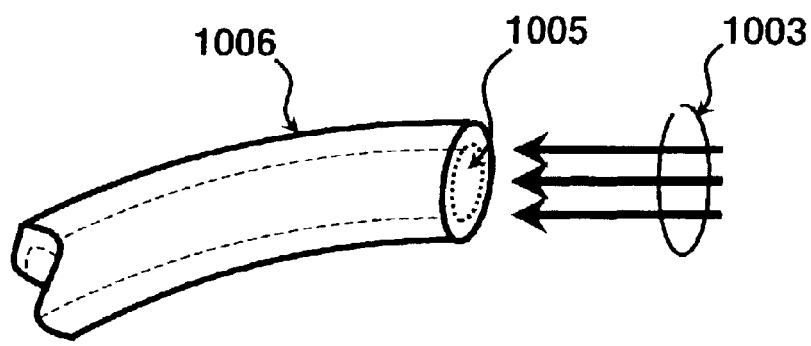

FIG. 10b shows a group of wavelength signals 1004 incident upon the multi-mode core 1005 of a multi-mode output fiber 1006. Multimode optical fibers known in the art may have step index or graded index profiles, and can have core diameters that range from approximately 30 to 140 microns. In general, the larger the multi-mode fiber core, the broader the spectrum of signals that will couple directly into the multi-mode fiber.

Figure 10C:
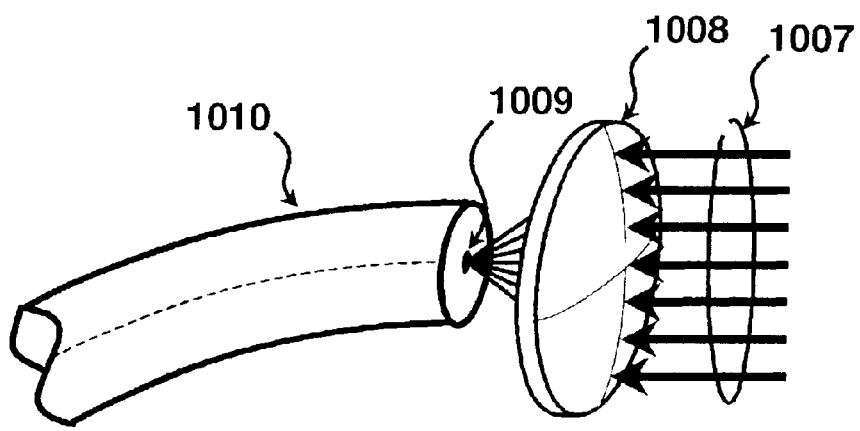

However, modal dispersion in large core diameter multi-mode optical fibers restricts the distance that a high-speed data signal can be carried without impairment. FIG. 10c shows a third alternative configuration where a group of wavelength signals 1007 is coupled by a condenser micro-lens 1008 to focus on the core 1009 of a single mode (or small core diameter multi-mode) output fiber 1010. This configuration does not in general achieve perfect mode matching of any wavelength signal, and so cannot achieve lossless coupling. It is possible however to adjust the lens focal length and position to achieve uniform excess insertion loss over a moderately broad acceptance spectrum.

Figure 11:
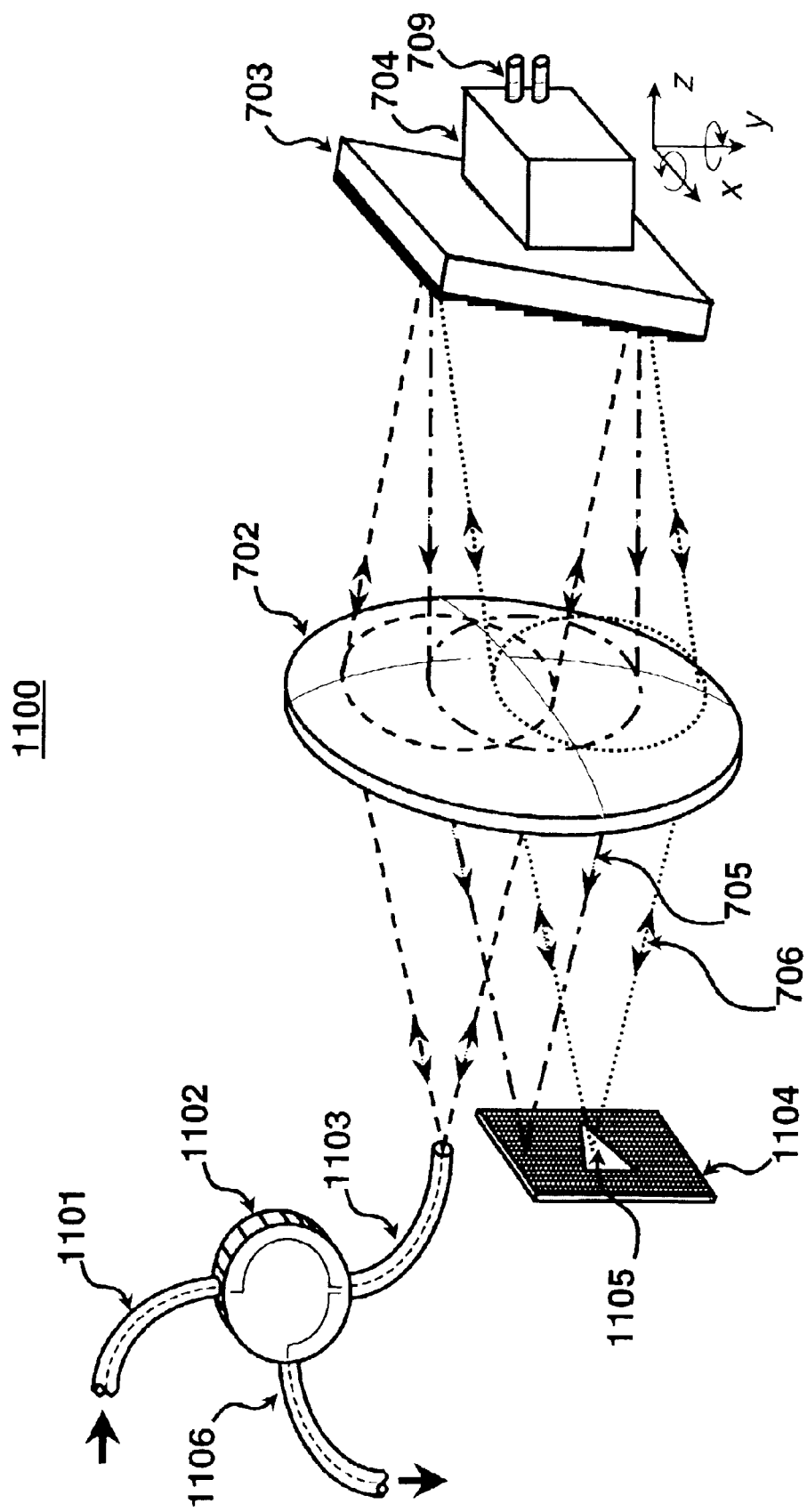
FIG. 11 shows a double-passed spectral filter with optical output through an optical circulator.

A third embodiment of a spectrum steering filter is the variable-bandwidth tunable spectral filter with optical output 1100 shown in FIG. 11. With reference now to that FIG. 11, a multiwavelength input signal carried on input fiber 1101 passes through optical circulator 1102 to input/output fiber 1103. Signals emitted from input/output fiber 1103 are collimated by lens 702 and illuminate planar reflective diffraction grating 703 mounted on tip/tilt stage 704 capable of rotating grating 703 about its X-axis or Y-axis. Each wavelength signal beam is diffracted into an angle corresponding to its wavelength; for illustration, two wavelength signals 705 and 706 are drawn using a dashed and a dotted line, respectively. All signals are focused by a second pass through lens 702 and are imaged onto a permanent spectral-plane structure 1104 with an absorptive layer covering a glass substrate everywhere except for a wedge-shaped reflective region 1105. Unlike filters 700 and 900, which extract the selected spectral signal at the dispersed spectral-plane, in filter 1100 the selected spectral signals are reflected at the dispersed spectral-plane and retrace their path through the optical system to be collected into a single image spot at the face of input/output fiber 1103.

The output signals are coupled into input/output fiber 1102 (counterpropagating to the input signals) then directed by optical circulator 1102 into separate output fiber 1106. As in filters 700 and 900, tilt of the grating about its X-axis controls the center wavelength of the transmitted spectrum and tilt of the grating about its Y-axis controls the wavelength bandwidth of the transmitted spectrum. Double-passing the optical system adds optical loss but has the significant advantage of recollecting an arbitrarily large band (or multiple band) output signal into a single image spot, allowing uniform low insertion loss coupling of an arbitrary output wavelength spectrum.

As can be readily appreciated, optical circulators increase system cost and insertion loss. Accordingly, a fourth embodiment of an optical filter 1200 with optical input and output and no circulator is shown in FIG. 12.

Figure 12:
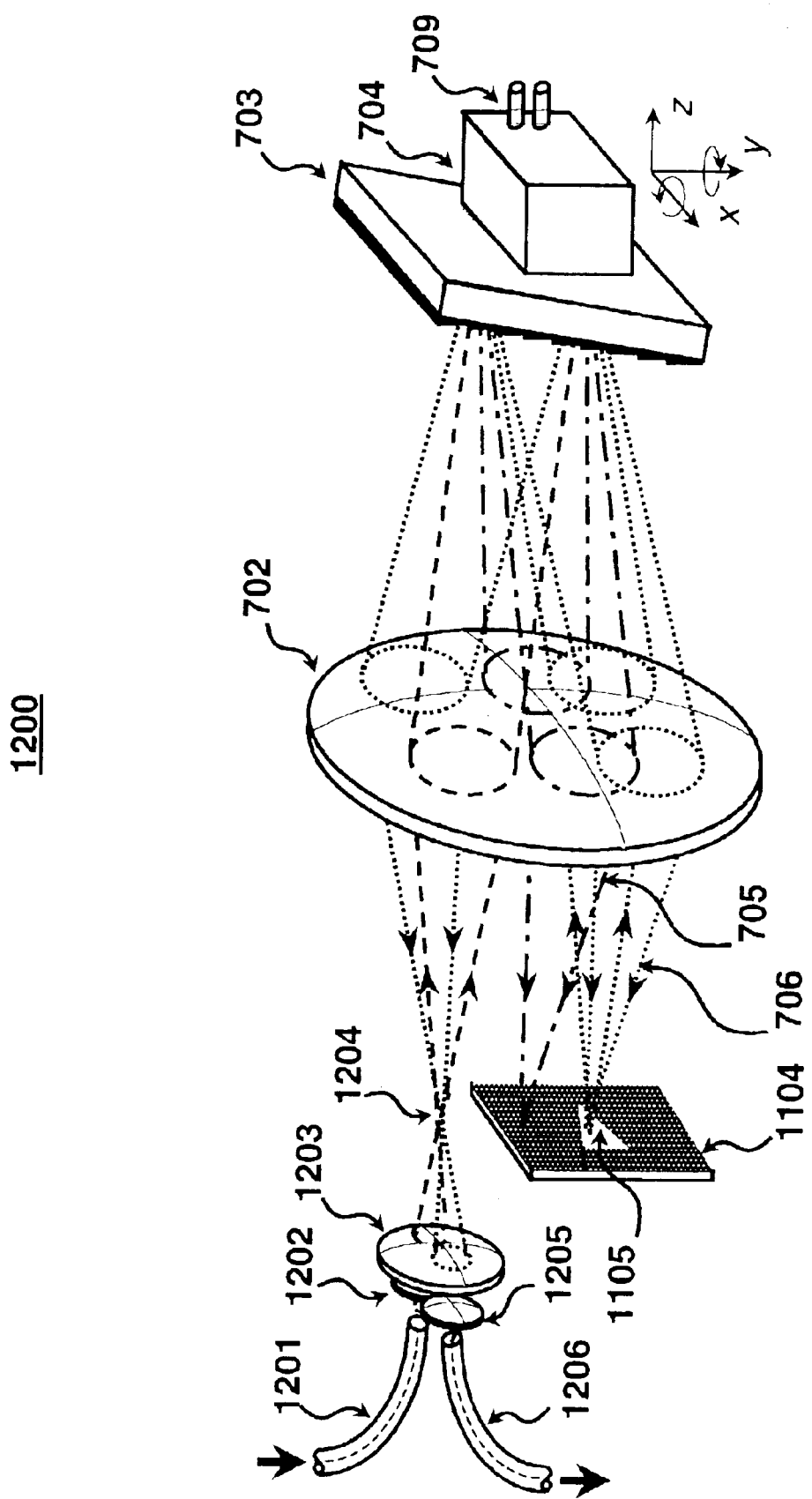
FIG. 12 shows a double-passed spectral filter with optical output through a second fiber.

Turning now to that FIG. 12, a multi-wavelength input signal carried on input fiber 1201 is collimated by micro-optic lens 1202 and then illuminates micro-optic lens 1203 off-center from the optical axis so that the input signal is focused at an angle to focal point 1204, which forms the input point for the spectrally dispersive imaging system. Input light from focal point 1204 is collimated by lens 702 and illuminates planar reflective diffraction grating 703 mounted on tip/tilt stage 704 capable of rotating grating 703 about its X-axis or Y-axis. Each wavelength signal beam is diffracted into an angle corresponding to its wavelength; for illustration, two wavelength signals 705 and 706 are drawn using a dashed and a dotted line, respectively. All signals are focused by a second pass through lens 702 and are imaged onto a permanent spectral-plane structure 1104 with an absorptive layer covering a glass substrate everywhere except for a wedge-shaped reflective region 1105. As in optical filter 1100, the selected spectral signals are reflected at the dispersed spectral-plane and retrace their path through the optical system to be collected into a single image spot.

In filter 1200, the image spot is at point 1204. Output signals pass through point 1204 at a complementary angle to the input signal and illuminate micro-optic lens 1203 off-center from the optical axis so that the emerging collimated signal illuminates output micro-optic lens 1205 and is focused into output fiber 1206.

Closed loop control of the angular position of tip/tilt mount 704 based on feedback from some measurement of position can enable greater accuracy and stability. Closed loop control can be based on an external measurement of the optical signal coupled into the output fiber as, for example, an optical spectrum analyzer elsewhere in the fiber optic communications system. It is preferable, however, to provide an internal measurement of the signal position.

Figure 13:
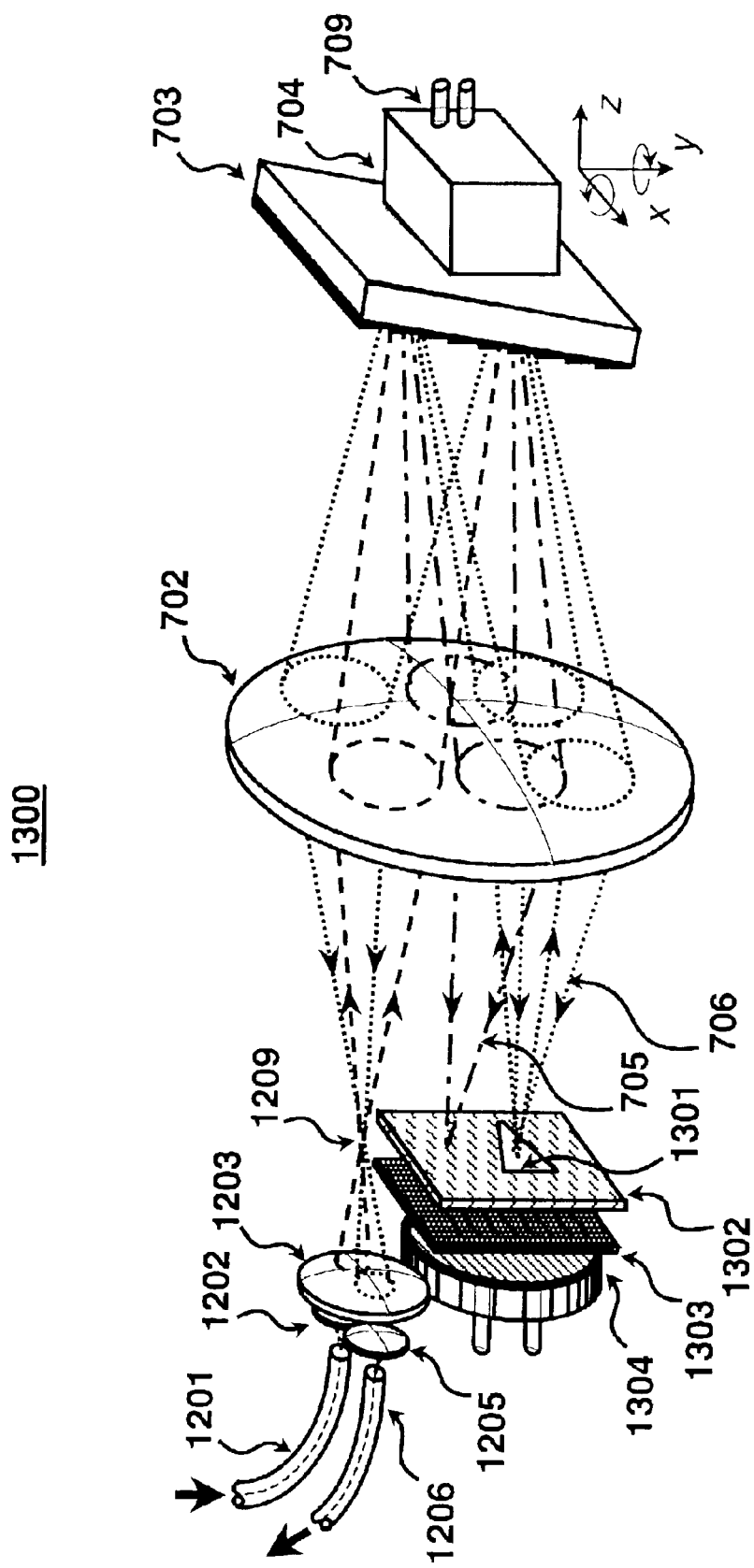
FIG. 13 shows a tunable spectral filter with a patterned detector for feedback alignment control.

FIG. 13 shows an optical filter 1300 with such a closed loop feedback position. Referencing that FIG. 13, filter 1300 is substantially similar to the previous filter 1200 with the exception of the permanent spectral plane structure that includes three elements. The first element is a wedge-shaped reflective region 1301 on transmissive substrate 1302. This structure reflects a selected wavelength region into the output fiber, as does permanent spectral plane structure 1104 in optical filters 1100 and 1200. The second element, located in close proximity to substrate 1302, is a spatial filter 1303 with one or more transparent apertures. As drawn, the apertures are a set of horizontal slits. The third element is a large aperture optical detector 1304 positioned behind spatial filter 1303 such that any light that is transmitted through spatial filter 1303 is detected. The combination of spatial filter 1303 and detector 1304 registers an electrical signal in response to the spatial position of optical signals which would otherwise be discarded, yet which contain information about the position of the overall optical spectra on the spectral-plane structure, and so is useable for feedback control of tip/tilt stage 704.

Figure 14:
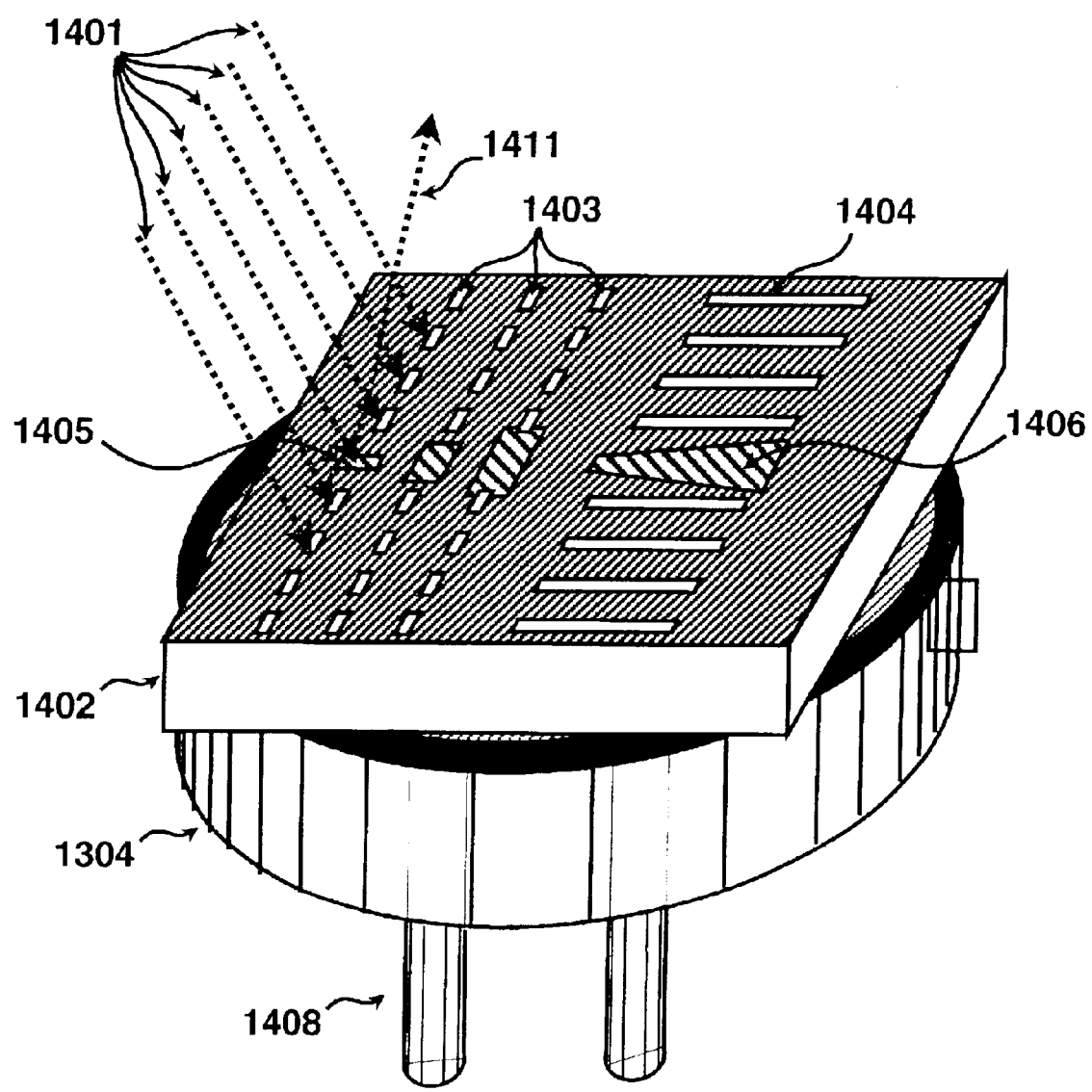
FIG. 14 shows a line-patterned detector for indexed position sensing and feedback control.

The use of patterned apertures for feedback control is understood with reference to FIG. 14, which shows a closer view of the combination of the patterned spectral plane structure 1302, patterned aperture 1303 and detector 1304 from optical filter 1300 of FIG. 13 and a column of input signals 1401 corresponding to 6 wavelengths on the transmission grid (for example at 100 GHz pitch). The signals illuminate a transparent glass substrate 1402 coated with an absorptive layer except where patterned with sets of apertures 1403 and 1404, and reflective regions 1405 and 1406. This patterned structure combines elements 1302 and 1304 from FIG. 13. Substrate 1402 covers optical detector 1304 with electrical output 1407 so that any signal transmitted through apertures 1403 and 1404 will be detected.

In general, multi-wavelength telecommunications systems use signal wavelengths that lie on the telecommunications standard ITU grid, which specifies allowed center wavelengths on a 50 GHz (0.4 nm) pitch. In specific applications, the signal wavelength may be known to lie on a restricted subset of these wavelengths, as for example in a C-band system with 40 signals at a 100 GHz pitch. Each wavelength signal can be expected to lie slightly above or below the target value, but the average of multiple signals is relatively accurate indication of the average signal wavelength. In any case, the relative position of any single wavelength signal is important in determining (and maintaining) optimum performance of the multi-wavelength transmission system. Therefore this apriori knowledge about the signals entering optical filter 1300 can be used to measure the wavelength of each single wavelength signal relative to the median position of the signals entering filter 1300.

The column of optical signals 1401 that enter the filter are spectrally dispersed onto the aperture array 1403. The lateral separation of the apertures is chosen to match the signal wavelength pitch such that the signal registered upon detector 1304 is maximum for discrete alignments of tip/tilt stage 704 for which the actual wavelengths of the WDM channels present align, on average, with locations in the filter spectral response corresponding to the design wavelengths. In effect, the detector registers the convolution of the signal wavelengths with a comb filter designating the design values. Once the signals are roughly aligned, the analog electrical output signal from detector carried on electrical connections 1408 can then be used for accurate position feedback Shown in FIG. 14, are patterned mirrors 1405 and 1406 to reflect the signal of interest 1409 into the optical output, and the system may select from one of three discrete wavelength bandwidths or use the tapered wedge reflector for a continuously tunable wavelength bandwidth. It is also possible to use a partial reflector, or an aperture that is small compared to the area of the wavelength signal, to register a portion of the output signal on detector 1304. With appropriate design of the aperture pattern, a variety of position feedback systems can be implemented to accommodate specific filter functions and system environments.

Although all of the system embodiments described so far use reflective optical system geometries based on the reflective beam steering configurations shown in FIGS. 5(*a–d*), it is also possible to construct an optically equivalent system using a transmissive beam steering means. Such means can include, for example, use of rotating prism pairs (e.g., William L. Wolfe, *Introduction to Infrared System Design*, SPIE PRESS Volume TT24, Chapter 12), liquid crystal beam deflectors (e.g., R. McRuer et al, "Ferroelectric liquid-crystal digital scanner", Opt Lett. 15, pp. 1415–1417, 1990; see also U.S. Pat. No. 4,964,701) and electro-optic beam deflectors (e.g., J. Thomas and Y. Fainman, "Optimal cascade operation of optical phased-array beam deflectors," Applied Optics, Vol. 37(26), pp. 6196–212, 1998).

Figure 15:
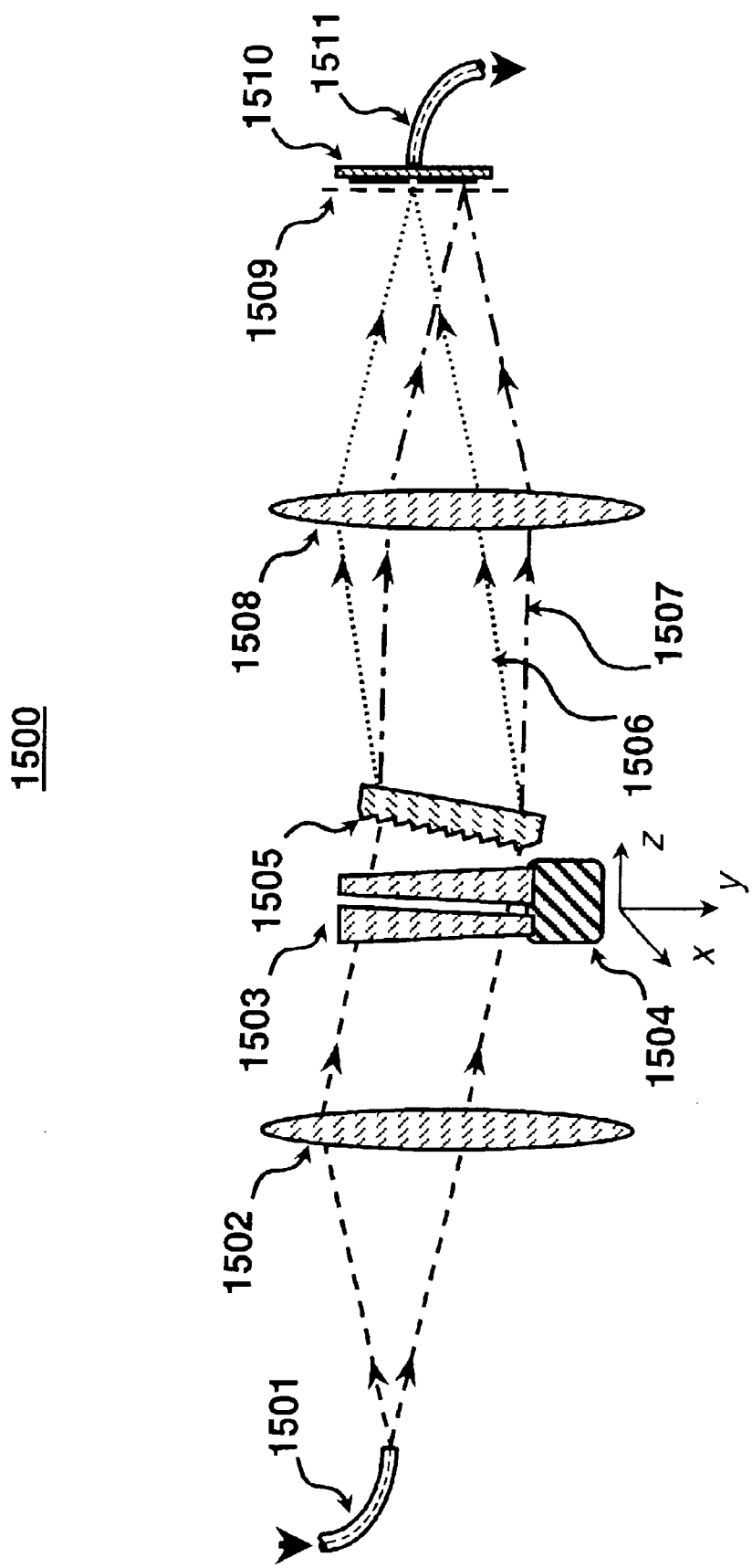
FIG. 15 shows a transmissive configuration of a spectrum steering system.

As an example, the reflective optical filter 900 shown in FIG. 9 can be equivalently constructed as the transmissive optical filter 1500 shown in FIG. 15. Turning now to that FIG. 15, multi-wavelength input signals carried on input fiber 1501 are collimated by lens 1502 and illuminate a transmissive beam steering device capable of independently directing the transmitted signals along the vertical and horizontal axis. As shown in FIG. 15, the beam steering device consists of two prisms 1503 mounted on rotation stage 1504 capable of rotating each prism independently around the Z-axis. All of the transmitted and angularly directed signals are diffracted by a transmissive diffraction grating 1505 so that each wavelength signal is deflected into an additional angle corresponding to its wavelength; for illustration, two wavelength signals 1506 and 1507 are drawn using a dashed and a dotted line, respectively. All signals are then focused by a second lens 1508 onto the spectrally dispersed image plane 1509, where each signal is vertically displaced by a distance corresponding to its wavelength, and illuminates a permanent spectral-plane structure 1510 with a patterned absorptive or reflective layer covering a glass substrate everywhere except for a wedge-shaped transmissive region. As in filter 900, a broad-spectrum signal would be imaged into a continuous column of spots on the face of the permanent spectral-plane structure. As shown in FIG. 15, the wavelength signal 1507 is imaged onto the absorptive region and is absorbed, while the wavelength signal 1506 is imaged onto a clear region and is transmitted through the transparent structure 1510 and coupled into output fiber 1511. During operation, deflection of the signals about the X-axis controls the center wavelength of the transmitted spectrum, and deflection of the signals the Y-axis controls the wavelength bandwidth of the transmitted spectrum. Equivalent transmissive system embodiments can be constructed for each of the systems described herein.

All of the systems described so far use angular tilt of the collimated signal beams to introduce a lateral shift at the spectrally dispersed image plane. The same concepts for optical filtering using a permanent spectral-plane structure can be also implemented using a physical translation of either the input fiber or the permanent spectral-plane structure. A variety of physical translation actuators can be used to control lateral position, including for example threaded screws driven by stepper motors, by direct current motors, by piezo-electric actuators, or driven manually.

Figure 16:
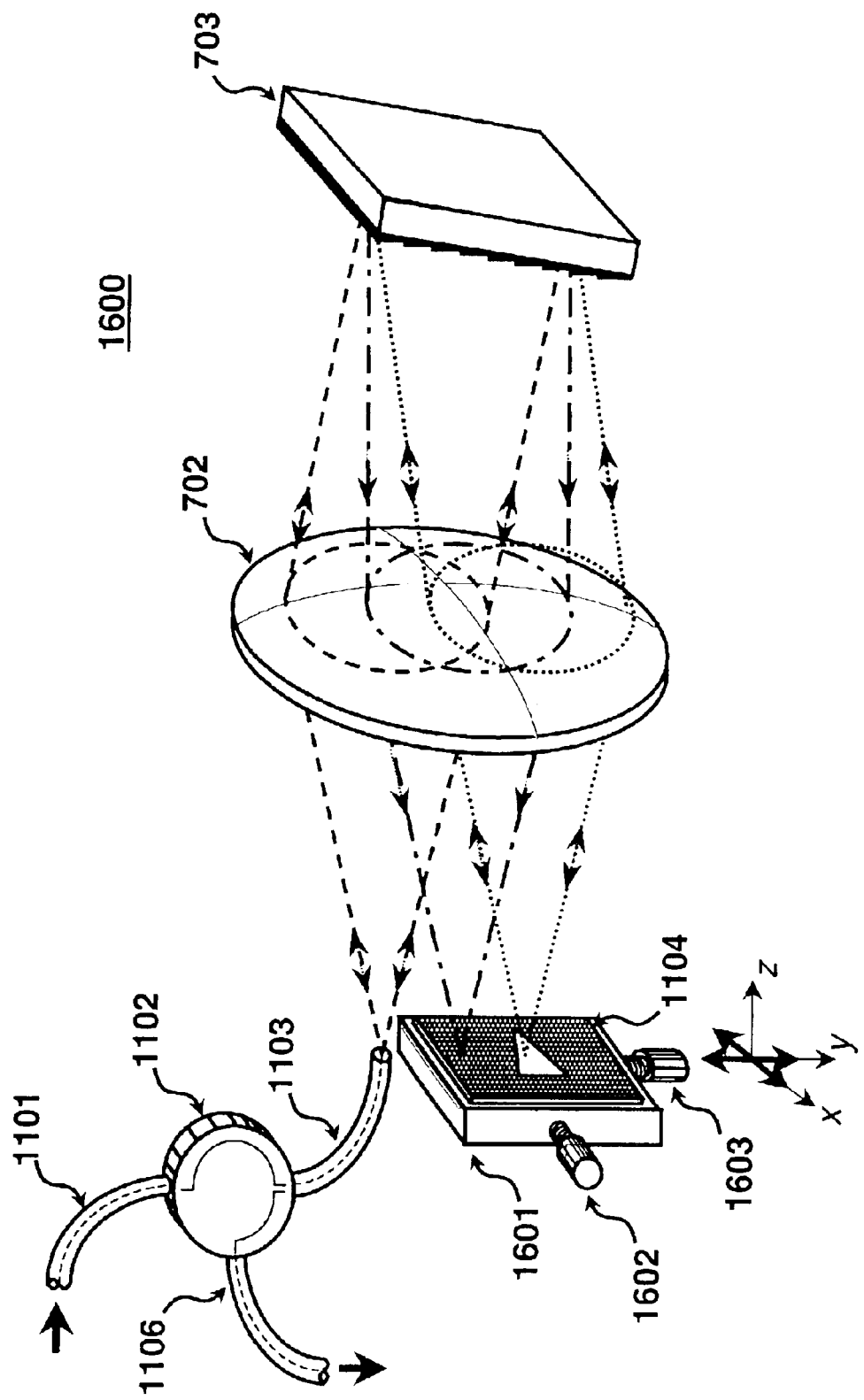
FIG. 16 shows a spectrum steering system using lateral movement of the spectral-plane structure.

By way of example, and with reference now to FIG. 16, there is shown an optical filter that is functionally similar to the optical filter 1100. As in filter 1100, an input signal carried on fiber 1101 passes through optical circulator 1102 to input/output fiber 1103, then is collimated by lens 702 and illuminates reflective diffraction grating 703 that is now fixed in position. Each wavelength signal beam is diffracted into an angle corresponding to its wavelength then focused by a second pass through lens 702 and imaged onto a permanent spectral-plane structure 1104 with an absorptive layer covering a glass substrate everywhere except for a wedge-shaped reflective region that reflects a selected portion of the signal back through the optical system, into input/output fiber 1103, through optical circulator 1102 into separate output fiber 1106. Instead of using a tip/tilt stage for position control, however, spectral plane structure 1104 is mounted on two-axis translation stage 1601 so that its lateral position can be directly controlled by horizontal (X-axis) and vertical (Y-axis) actuators 1602 and 1603, respectively. In FIG. 16, the two lateral position actuators are manual screws. Actuator 1603 then controls the center wavelength of the transmitted signal, and actuator 1602 controls the wavelength bandwidth of the transmitted signal. Equivalent lateral-shifting embodiments can be constructed for each of the systems described herein.

In systems that use a second pass of the optics to recollect the filtered multi-wavelength signals into a single mode output fiber (e.g., FIG. 3, 300; FIG. 11, 1100; FIG. 12, 1200; FIG. 13, 1300, and FIG. 16, 1600) the ideal position of both the tilting mechanism and the diffraction grating is in the back focal plane of the large collimation lens (FIG. 3, 304). This provides telecentric imaging, and optical coupling efficiency of the recollected signals into the single mode output fiber. This can be achieved using a bulk reflective grating directly mounted on a macroscopic optomechanical tip/tilt stage, as drawn in FIGS. 3, 11, 12, 13, and 16. It can also be achieved in a more cost-effective way by combining the reflective grating with a micromechanical tip/tilt device. Single-tuning axis micromechanical angle-tuned diffraction gratings suitable for laser tuning have been demonstrated in prior art, e.g. M. H. Kiang, et al, "Surface-Micromachined Diffraction Gratings for Scanning Spectroscopic Applications," Proc. Int. Conf. Solid-State Sensors and Actuators, Chicago, Ill., June 1997.

Figure 17A:
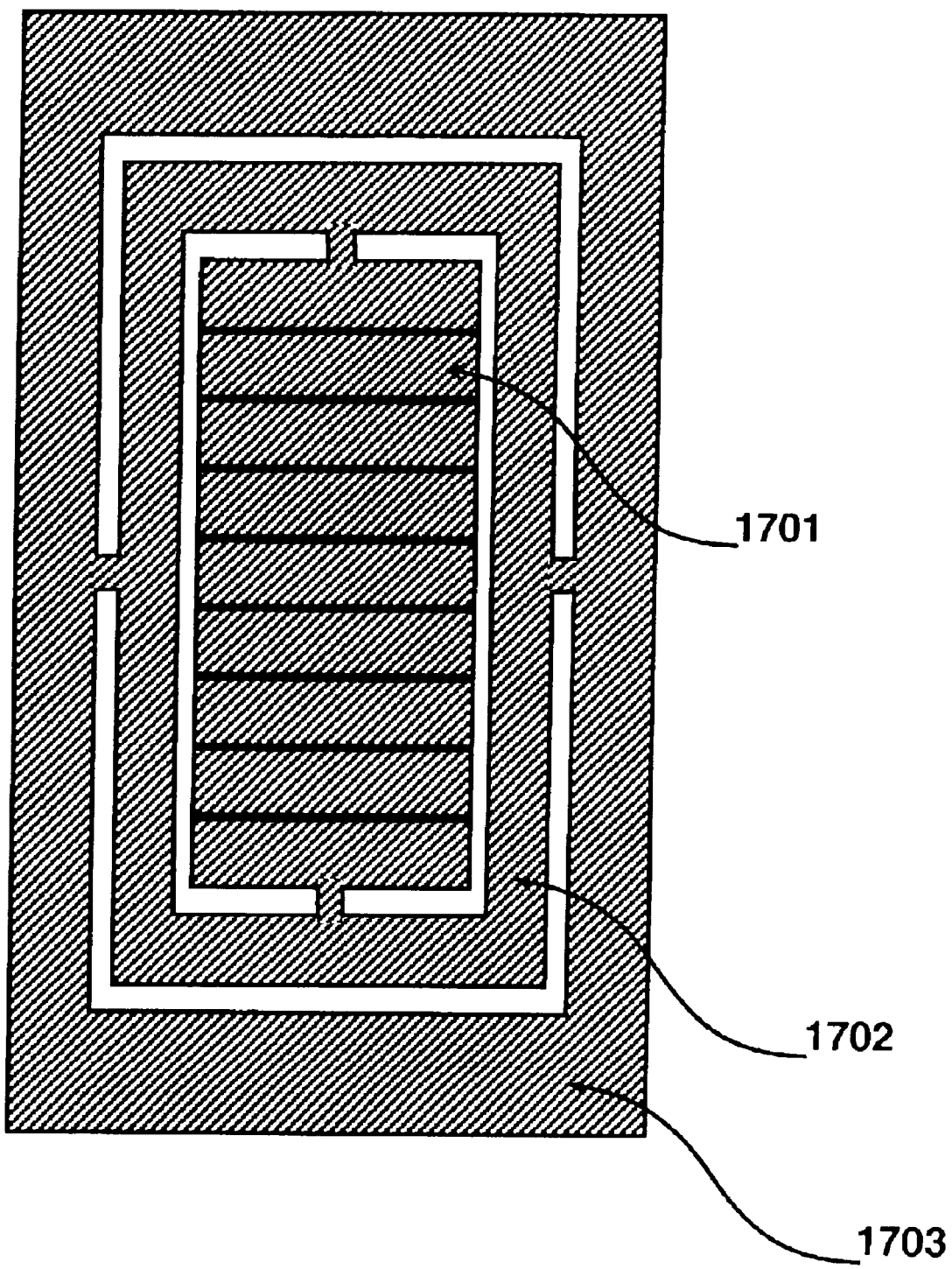
FIGS. 17a and 17b show a micromechanical tilt-grating actuator.
Figure 17B:
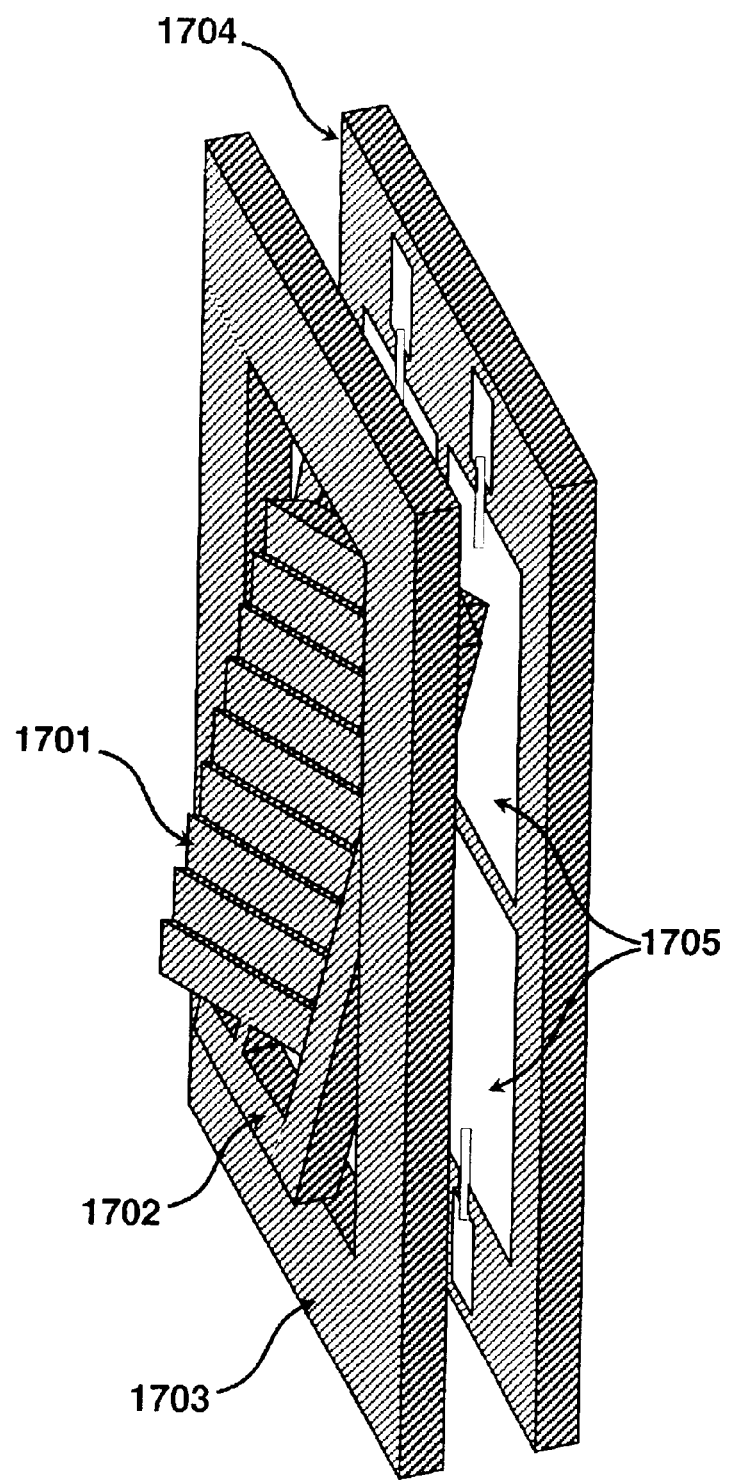

Finally, a two-axis angle-tuned diffraction grating suitable for spectrum steering is shown in FIG. 17. With reference now to that FIG. 17, a planar silicon upper substrate is micromachined into a planar diffraction grating 1701 connected by two torsion bars to an inner gimbal ring 1702, which is in turn connected by two torsion bars to an outer gimbal ring 1703. The upper substrate is supported with an air gap above a lower substrate 1704 which is patterned with electrodes 1705 capable of creating an electrostatic attractive force on a portion of the movable grating, such that the angular position of the grating can be controlled by applying a combination of voltages to the control electrodes. Such a device can be fabricated using, for example, a silicon-on-insulator bulk silicon MEMS fabrication process where the diffraction grating is formed using binary or analog surface profile etching of a upper silicon layer, silicon oxide as a dielectric stand-off layer, and wafer bonding to join the top layers to a lower substrate which is patterned with the drive electrodes. Silicon is transparent to the telecommunications wavelength region, so it is possible to pattern the diffraction grating surface relief on either the top or bottom of the upper silicon layer, provided a reflective coating (typically one or more thin layers of metal) is applied to the grating surface relief pattern.

Functionally identical angle-tunable diffraction gratings can be constructed by fabricating a diffraction grating on any micromechanical structures developed to position a two-axis tilt mirror, including surface micromachining with electrostatic plate actuators, bulk micromachining with comb drive actuators. The grating would ideally be fabricated as a surface relief profile etched into the top planar structure. It is also possible to emboss a grating on the surface of an otherwise planar structure, as for example using a thin layer of epoxy which is shaped by physical contact with a master grating structure (a technique used in the art of replicating fixed surface relief diffraction gratings), or using a thin layer of optical sensitive material, such as photopolymer, and optically recording a holographic grating structure (a technique used in the creating of fixed holographic gratings).

Various additional modifications of this invention will occur to those skilled in the art. Accordingly, all deviations from the specific teachings of this specification that basically rely upon the principles and their equivalents through which the art has been advanced are properly considered within the scope of the invention as described and claimed.

What is claimed is:

1. A tunable spectral filter comprising:
   a reflective diffraction grating for spatially separating a multiple wavelength input signal;
   a beam steerer for laterally shifting the spatially separated multiple wavelength input signal: said beam steerer including a mirror, said mirror being positioned such that the spatially seperated multiple wavelength input signal is reflected by the mirror, diffracted by the reflective grating and then reflected by the mirror again; and
   a fixed optical element, positioned in the demultiplexed image plane, for selectively reflecting, deflecting, transmitting, and absorbing the laterally shifted, spatially separated wavelength input signal.

2. The tunable spectral filter according to claim 1 further comprising:
   a power detector, for measuring the optical power of a controllable portion of the spectrally demultiplexed wavelength input signal.

3. The tunable spectral filter according to claim 1 further comprising:
   a position detector, situated in the demultiplexed image plane, for detecting the position of the spatially demultiplexed signal such that feedback stabilization control is provided.

4. The tunable spectral filter according to claim 1 wherein said beam steerer comprises a transmissive grating.

5. The tunable spectral filter according to claim 1 wherein said beam steerer mirror, is positioned such that the spatially separated multiple wavelength input signal is diffracted by the reflective grating and reflected by the mirror back to the grating.

6. The tunable spectral filter according to claim 1 wherein said mirror is a MEMS tilt mirror.

7. The tunable spectral filter according to claim 1 further comprising a mirror-controller, for selectively controlling an angle of the mirror.

8. The tunable spectral filter according to claim 1, wherein said grating is capable of selectively tilting.

9. The tunable spectral filter according to claim 8, wherein said selectively tiltable grating is a MEMS tilt grating.

10. The tunable spectral filter according to claim 9, wherein said selectively tiltable grating includes an angle-controller.

11. The tunable spectral filter according to claim 1 further comprising:
    a spectrum translator, for translating the spectrum in a direction perpendicular to the direction of dispersion.

12. A tunable spectral filter comprising:
    a reflective diffraction grating for spatially separating a multiple wavelength input signal;
    a beam steerer, for laterally shifting the spatially separated multiple wavelength input signal in a direction perpendicular to the direction of diffraction; and
    a fixed optical element, positioned in the demultiplexed image plane, for selectively reflecting, deflecting, transmitting, and absorbing the laterally shifted, spatially separated wavelength input signal.

13. The tunable spectral filter according to claim 12 further comprising:
    a power detector, for measuring the optical power of a controllable portion of the spectrally demultiplexed wavelength input signal.

14. The tunable spectral filter according to claim 12 further comprising:
    a position detector, situated in the demultiplexed image plane, for detecting the position of the spatially demultiplexed signal such that feedback stabilization control is provided.

15. The tunable spectral filter according to claim 12 wherein said beam steerer further comprises:
    a mirror, positioned such that the spatially separated multiple wavelength input signal is diffracted by the reflective grating and reflected by the mirror back to the grating.

16. The tunable spectral filter according to claim 15 wherein said mirror is a MEMS tilt mirror.

17. The tunable spectral filter according to claim 15 further comprising a mirror controller, for selectively controlling an angle of the mirror.

18. The tunable spectral filter according to claim 12 wherein said grating is selectively tiltable.

19. The tunable spectral filter according to claim 18 wherein said selectively tiltable grating includes an angle controller.

20. A tunable spectral filter comprising:
    a MEMS selectively tiltable reflective diffraction grating for spatially separating a multiple wavelength input signal and laterally shifting the spatially separated multiple wavelength input signal;
    a beam steerer for laterally shifting the spatially separated multiple wavelength input signal; and
    a fixed optical element, positioned in the demultiplexed image plane, for selectively reflecting, deflecting, transmitting, and absorbing the laterally shifted, spatially separated wavelength input signal.

21. The tunable spectral filter according to claim 20 further comprising:
    a power detector, for measuring the optical power of a controllable portion of the spectrally demultiptexed wavelength input signal.

22. The tunable spectral filter according to claim 20 further comprising:
    a position detector, positioned in the demultiplexed image plane, for detecting the position of the spatially demultiplexed signal such that feedback stabilization control is provided.

23. The tunable spectral filter according to claim 20 wherein said selectively tiltable grating includes an angle controller.

* * * * *